United States Patent
Itoh et al.

[19]

[11] Patent Number: 6,032,865
[45] Date of Patent: Mar. 7, 2000

[54] METHOD OF READING BAR CODE

[75] Inventors: Motohiko Itoh; Shinichi Satoh; Mitsuo Watanabe; Hiroaki Kawai; Isao Iwaguchi, all of Kawasaki, Japan

[73] Assignee: Fujitsu Limited, Kawasaki, Japan

[21] Appl. No.: 09/356,022

[22] Filed: Jul. 16, 1999

Related U.S. Application Data

[62] Division of application No. 08/989,834, Dec. 12, 1997.

[30] Foreign Application Priority Data

Jan. 31, 1997 [JP] Japan .................................. 9-019286

[51] Int. Cl.[7] ........................................................ G06K 7/10
[52] U.S. Cl. ............... 235/462.25; 235/377; 235/462.18; 235/462.28; 235/494
[58] Field of Search ............................... 235/462.25, 376, 235/377, 462.18, 462.28, 494

[56] References Cited

U.S. PATENT DOCUMENTS

| | | | |
|---|---|---|---|
| 3,887,793 | 6/1975 | Goodfinger et al. | 235/462.25 X |
| 5,036,183 | 7/1991 | Ouchi et al. | 235/462.25 X |
| 5,155,344 | 10/1992 | Fardequ et al. | 235/462.25 X |
| 5,245,167 | 9/1993 | Takenaka | 235/462.25 X |
| 5,369,265 | 11/1994 | Adachi et al. | 235/470 X |
| 5,686,717 | 11/1997 | Knowles et al. | 235/462.25 X |
| 5,773,809 | 6/1998 | Watanabe et al. | 235/462.25 X |

FOREIGN PATENT DOCUMENTS 0 582 911  2/1994  European Pat. Off. .

*Primary Examiner*—Michael G Lee
*Attorney, Agent, or Firm*—Staas & Halsey LLP

[57] ABSTRACT

A method of the invention reads a bar code based on bar-code data obtained by scanning the bar code with light. The method includes the steps of a) obtaining bar-code data, b) obtaining a sum of bar-data widths with respect to a predetermined number of bar data provided in at least one of a preceding portion and a following portion of the bar-code data, c) repeating the steps a) and b) once to obtain another sum, and d) making a comparison of the sum with another sum. The methods further includes a step of accepting the bar-code data as valid data when a result of the comparison satisfies a predetermined condition.

3 Claims, 23 Drawing Sheets

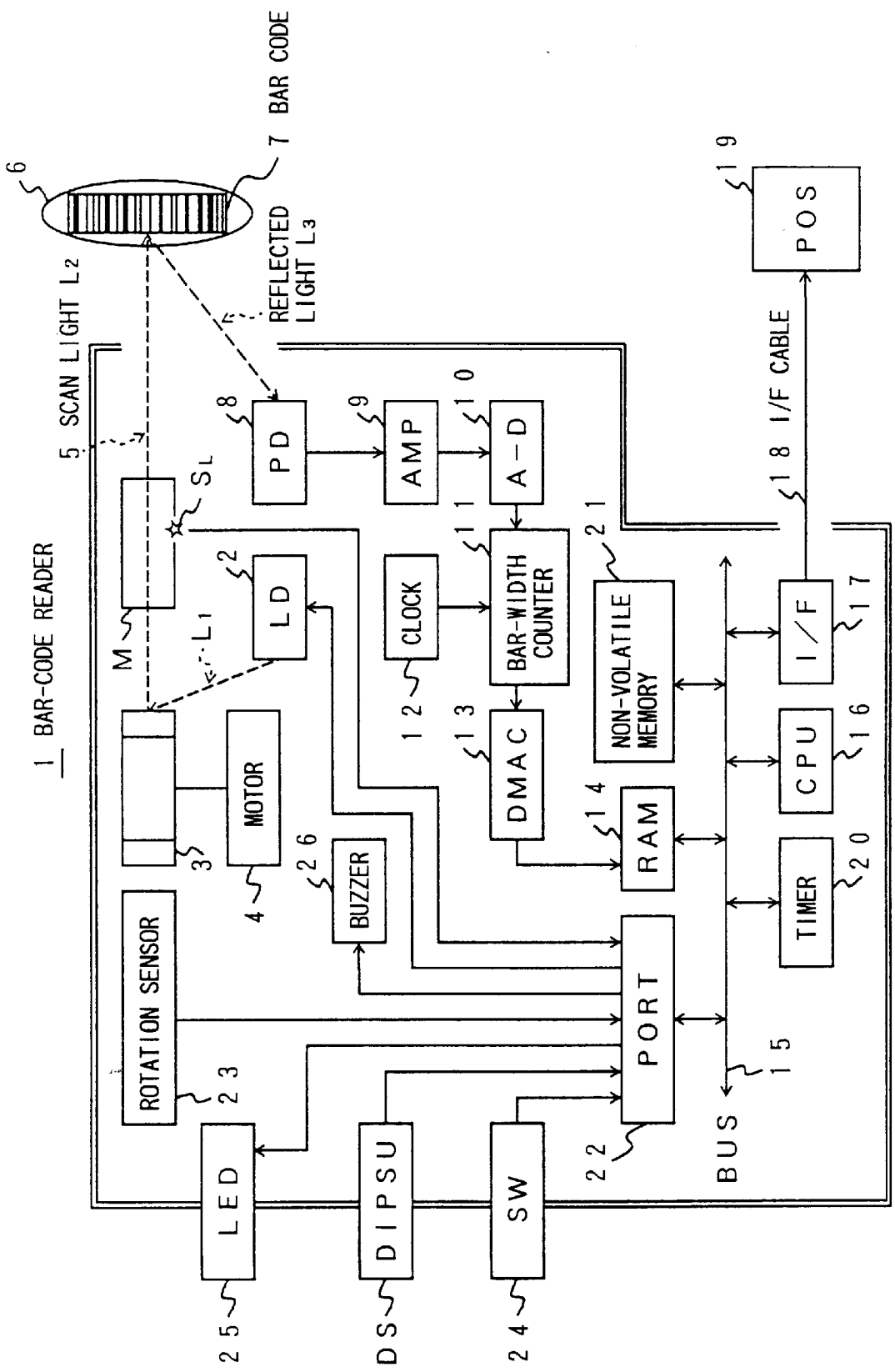

METHOD OF READING BAR CODE

This application is a division of application Ser. No. 08/989,834, filed Dec. 12, 1997, now pending.

BACKGROUND OF THE INVENTION

1. Field of the Invention

The present invention generally relates to methods of reading bar codes and bar-code reading devices, and particularly relates to a method of reading bar codes and a bar-code reading device which is equipped with a hand-held bar-code reader using a laser light.

In recent years, laser-based bar-code readers have been widely used as often seen in POS (point of sales) systems in a distribution industry, and such readers are generally fixed to a check-out counter while allowing bar codes to be read in a non-contacting manner. An ever increasing range of products requires diversified use of such bar-code readers. Efforts thus have been directed to development of a hand-held bar-code reader, which can be picked up from a fixed position on the counter where it is used as a fixed-type bar-code reader, in order to cope with a variety of products at the check-out counter.

2. Description of the Prior Art

Hand-held bar-code readers are often used for reading bar-code menus.

The bar-code menus are useful when bar-code labels cannot be attached to some types of products.

When unlabeled products need to be processed, a bar-code reader is used for reading bar codes on a separate bar-code menu which gives a list of the unlabeled products. Bar-code readers for reading the bar-code menus typically include a pen-type bar-code reader and a touch-scanner-type bar-code reader, which have a relatively short (sensor) readable range. Because of the short readable range, these types of bar-code readers need to come in contact with bar codes in order to read the bar codes.

On the other hand, laser-based bar-code readers are characterized by having a long (sensor) readable range. The long readable range allows the laser-based bar-code readers fixedly mounted on check-out counters to read bar codes when products with bar-code labels are shown, i.e., exposed or presented to a scan window of the readers. These bar-code readers can read bar codes as long as the bar codes are presented within a certain range from the scan window. Operators do not have to be overly sensitive about positions of products when showing the products with bar-code labels to the bar-code readers. This type of bar-code reader is suitable for reading a large number of bar codes in a short period of time.

Recent development of technology has made it possible to create laser-based bar-code readers which are normally mounted to a counter, but can also be used as hand-held readers as such a need arises. These bar-code readers are mounted to a counter table or the like to read bar codes when products with bar-code labels are processed. When there is a need to read a separate bar-code menu with respect to unlabeled products or there is a need to read a bar code attached to a heavy product which cannot be held by hand over the scan window, the bar code reader is detached from the counter table to read the bar-code menu or the bar code on the heavy product.

The laser-based hand-held bar-code readers have a long readable range as do the fixedly mounted laser-based bar-code readers. When there is a need to read a separate bar-code menu, what is expected most of the time is to read only a couple of bar codes among many bar codes recorded on the bar-code menu. Since an intended bar code is listed among other bar codes, use of bar-code readers having a long readable range may result in reading other unnecessary bar codes along with the intended bar code. Further, even during a time when an operator brings a bar-code reader closer to the intended bar code, laser-scan light continues to be emitted from the scan window of the bar-code reader, ending up scanning irrelevant bar codes.

Some of the laser-based hand-held bar-code readers obviate this problem by making the sensor readable range shorter when the bar-code readers are used in a hand-held manner. With a shortened readable range, bar-code readers do not pick up unnecessary bar codes other than the intended bar code. When this configuration is used, however, the merit of the long readable range cannot be utilized to the full extent. Bar-code readers may be used for other purposes than reading a bar-code menu, as in the case of a heavy product, wherein it is preferable to have a long readable range to read a bar code from some distance. Such demand cannot be met if bar-code readers are limited to a short readable range when picked up by hand.

Further, even with a shortened readable range, bar-code readers may pick up unnecessary bar codes because the readers keep emitting laser-scan light from the scan window. Especially, when the bar-code readers are handled carelessly, there is an increased chance of reading irrelevant bar codes.

Accordingly, there is a need for a method of reading bar codes and a bar-code reading device which achieves reliable reading of bar codes in a hand-held operation while maintaining a long readable range.

SUMMARY OF THE INVENTION

Accordingly, it is a general object of the present invention to provide a method of reading bar codes and a bar-code reading device which can satisfy the need described above.

Also, it is a general object of the present invention to provide a method of reading bar codes and a bar-code reading device which achieves reliable reading of bar codes in a hand-held operation while keeping a long readable range.

In order to achieve the above object according to the present invention, a method of reading a bar code based on bar-code data obtained by scanning the bar code with light and by demodulating a reflected-light signal includes the steps of a) obtaining demodulated bar-code data, b) obtaining a sum of pulse widths with respect to a predetermined number of pulses provided in at least one of a preceding portion and a following portion of the demodulated bar-code data, c) repeating the steps a) and b) once to obtain another sum, and d) making a comparison of the sum with another sum. The methods further includes a step of accepting the demodulated bar-code data as valid data when a result of the comparison satisfies a predetermined condition.

According to the method described in the above, a predetermined number of pulses provided in a portion immediately preceding the bar-code data and/or a portion immediately following the bar-code data are detected, and a sum of pulse widths of these pulses are calculated. The detection of these pulses are due to margin portions, printed patterns, characters, shadows, etc., which surround the bar code. If the bar-code reader is in motion relative to the bar code, the pulse widths of the pulses surrounding the bar-code data should vary as the detection and demodulation of data are repeated. Because of this, a comparison of the sum obtained the first time with the sum obtained the second time makes it possible to decide whether the bar-code reader and the bar code are in relative motion.

According to one aspect of the present invention, a number as to how many pulses are in existence, rather than the sum of the pulse widths, is used for deciding whether the bar-code reader exhibits a relative motion against the bar code.

Further, the above-described method may be performed by a device for reading a bar code including a scan unit for emitting a first pattern of scan beam and a second pattern of scan beam, and a unit for using the first pattern in a first mode and using the second pattern in a second mode in order to read a bar code, the first pattern and the second pattern being selected by a user operation.

According to one aspect of the present invention, the first pattern is comprised of a plurality of scan beams, and the second pattern includes only one scan beam. That is, the first pattern is suitable for use when the bar-code reader is mounted on a counter, and the second pattern is used when the bar-code reader is pick up by the hand to read a bar-code menu or the like.

Other objects and further features of the present invention will be apparent from the following detailed description when read in conjunction with the accompanying drawings.

BRIEF DESCRIPTION OF THE DRAWINGS

FIG. 1 is a block diagram of an embodiment of the present invention;

DESCRIPTION OF THE PREFERRED EMBODIMENTS

In the following, an embodiment of the present invention will be described with reference to the accompanying drawings.

FIG. 1 is a block diagram of an embodiment of the present invention.

A bar-code reader 1 of the present invention is a laser-based bar-code reader, which illuminates bar codes by laser scanning, and detects light reflected from the bar codes in order to identify the bar codes. When products with bar-code labels are processed, the products are only required to be brought closer to the scan window to allow the bar-code reader to identify the bar codes, thereby allowing the bar-code reader to be fixedly mounted on a counter table or the like. When a separate bar-code menu or a bar code of a product which cannot be brought closer to the scan window needs to be read, the bar-code reader is detached from the counter table or the like, and the bar-code menu or the bar code of the product is read by operating the bar-code reader in a hand-held manner.

Figure 2C:
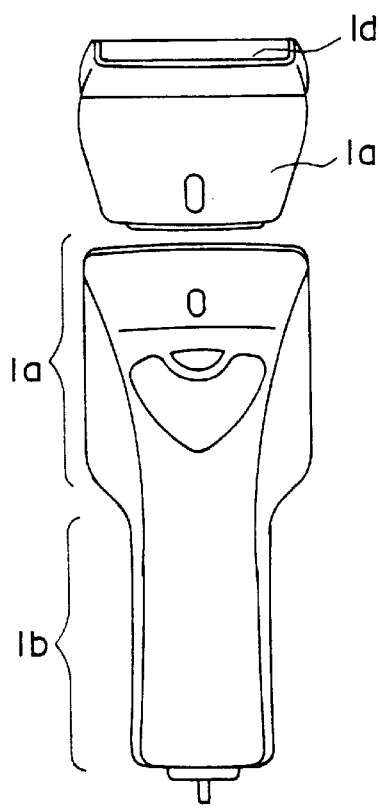
FIGS. 2A through 2C are illustrative drawings showing an appearance of a bar-code reader according to the embodiment of the present invention.
Figure 2B:
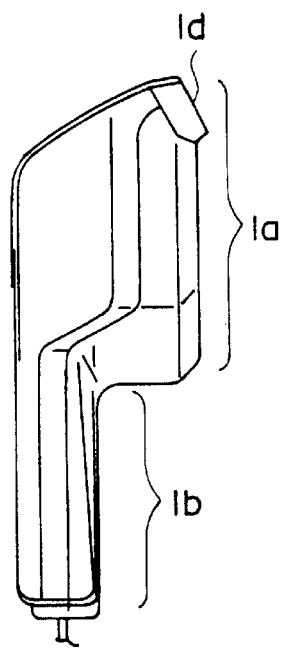
Figure 2A:
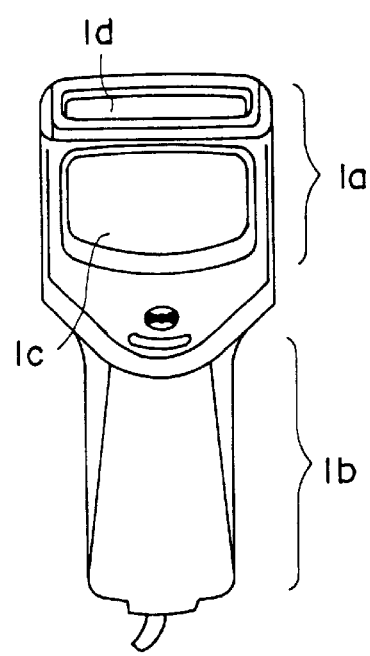

FIGS. 2A through 2C are illustrative drawings showing an appearance of the bar-code reader according to the embodiment of the present invention. FIG. 2A is a front view, and FIG. 2B is a side view. FIG. 2C is a rear view.

The bar-code reader 1 of the embodiment includes a head unit 1a and a grip unit 1b. The grip unit 1b may be mounted to a holder or the like when using the bar-code reader 1 in a fixed position operation.

The head unit 1a includes a laser-emission part, a polygon mirror, mirrors for dividing a scan beam, and an optical detector. Laser-scan light is emitted from the head unit 1a via a scan window 1c.

In the fixed position operation, products with bar-code labels are passed over the scan window 1c such that the bar-code labels are shown to the scan window 1c.

In a hand-held operation, the bar-code reader 1 is brought closer to an intended bar code which is printed on a sheet or a label such that the scan window 1c is closely positioned to the intended bar code. Alternately, another scan window 1d and a laser beam emitted therefrom may be used in the hand-held operation.

With reference back to FIG. 1, the bar-code reader 1 uses a laser diode 2 to emit laser light L1. The laser light L1 is directed to a polygon mirror 3.

The polygon mirror 3 is rotated by a motor 4, and has a plurality of reflection surfaces. The laser light L1 from the laser diode 2 is reflected and scanned by the polygon mirror 3, and is directed to a mirror M. The mirror M includes a plurality of mirrors. Laser light L2, which is reflected by the mirror M, is emitted from the bar-code reader 1 through a scan window 5.

Figures 3A, 3B:
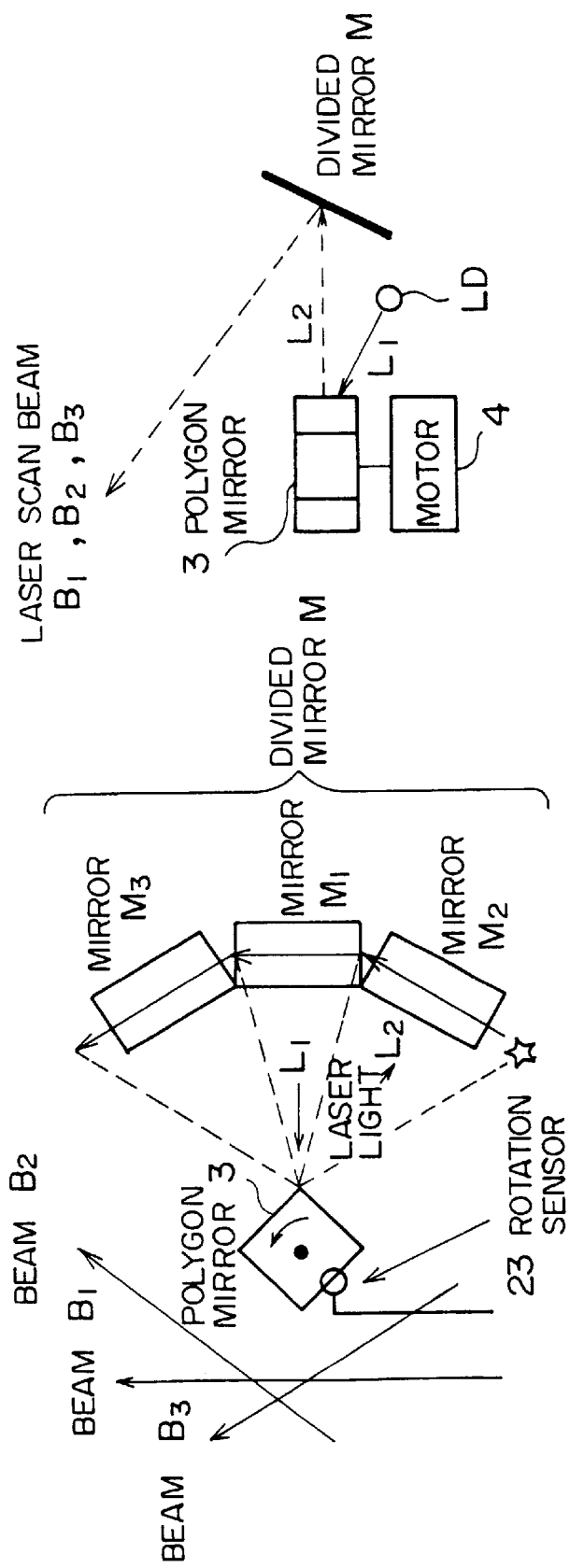
FIGS. 3A and 3B are illustrative drawings showing a configuration of an optical system used in the bar-code reader.

FIGS. 3A and 3B are illustrative drawings showing a configuration of an optical system used in the bar-code reader 1. FIG. 3A is a plane view, and FIG. 3B is a side view.

As shown in FIGS. 3A and 3B, the laser light L1 is scanned by the polygon mirror 3, and directed to the mirror M as the laser light L2. The mirror M includes mirrors M1, M2, and M3. The laser light L2 which is scanned by the polygon mirror 3 is reflected by the mirrors M1, M2, and M3, and becomes three beams B1, B2, and B3 in three different directions.

The motor 4 for rotating the polygon mirror 3 is provided with a rotation sensor 23, which detects the rotation of the polygon mirror 3. The rotation sensor 23 generates a predetermined number of pulses while the motor 4 or the polygon mirror 3 makes one rotation.

A scan position of the laser light L2 can be identified by counting the pulses generated by the rotation sensor 23. In this manner, it can be known as to which one of the beams B1, B2, and B3 is used for a given time period of a scan.

With reference back to FIG. 1, the laser light L2 (beams B1, B2, and B3) emitted from the bar-code reader 1 is illuminated onto a bar code 7 attached to a product 6. The bar code 7 has an arrangement of light reflecting bars and light absorbing bars (with low reflectivity) which is in accordance with a standard such as UPC (universal product code), EAN (European article code), or JAN (Japan article number) codes.

The laser light L2 is reflected by the bar code 7. Reflected light L3 illuminates a photo-diode 8 after passing through the scan window 5. The photo-diode 8 generates an electric current in response to the reflected light L3.

The electric current generated by the photo-diode 8 is supplied to an amplifier 9. The amplifier 9 amplifies the electric current which reflects an intensity of the reflected light L3.

A signal amplified by the amplifier 9 is supplied to an A/D converter (analog-to-digital converter) 10. The A/D converter 10 compares the signal level supplied from the amplifier 9 with a reference level, and outputs a pulse signal which becomes HIGH when the supplied signal level exceeds the reference level, and becomes LOW when the supplied signal level is smaller than the reference level. The pulse signal is provided to a bar-width counter 11. The bar-width counter 11 thus receives a digital pulse signal which is obtained from the reflected light L3 from the A/D converter 10, and, also, receives a clock signal from a clock generator 12.

The bar-width counter 11 counts a pulse width with respect to each of the HIGH levels and the LOW levels of the pulse signal by using the clock signal provided from the clock generator 12. The count numbers with respect to the HIGH levels and the LOW levels are supplied to a RAM 14 via a direct-memory-access controller 13.

The RAM 14 is connected to a CPU 16 via a bus 15. The count numbers reflecting a pattern of the bar code 7 is supplied to the CPU 16 from the RAM 14. The CPU 16 performs a recognition process for identifying the detected bar code, which process will be described later in detail. The bar code identified by the CPU 16 is supplied to a POS system 19 via an interface circuit 17 and an interface cable 18.

In addition to the RAM 14, the CPU 16, and the interface circuit 17, other elements are connected to the bus 15, including a timer 20, a nonvolatile memory 21, and an input/output port 22. As will be described later, the CPU 16 performs the recognition process based on signals supplied from the timer 20, the nonvolatile memory 21, and the input/output port 22.

The input/output port 22 is connected to the rotation sensor 23 for detecting a rotational position of the polygon mirror 3, a switch 24 for switching between the fixed position operation and the hand-held operation, a light-emission diode 25 for displaying a status of the recognition process, and a buzzer 26 for indicating the success/failure of the bar-code recognition. These elements are controlled by the recognition process of the CPU 16.

The CPU 16 has two different read-operation modes, i.e., a conventional-read mode and a stationary-detection mode.

The conventional-read mode uses demodulated data stored in the RAM 14 for the recognition process. Recognition results are transferred to the POS system 19 via the interface circuit 17 and the interface cable 18.

The stationary-detection mode uses demodulated data stored in the RAM 14 for the recognition process only when relative movement between the bar-code reader 1 and the bar code 7 is stopped. That is, data detected while there is a relative movement is regarded as invalid data in this stationary-detection mode.

The nonvolatile memory 21 stores data which indicates the stationary-detection mode. The data is stored in the nonvolatile memory 21 by setting the CPU 16 to a data-write-operation mode before the switching on of the device and by reading, during the conventional-read mode, a special bar code indicating the stationary-detection mode. The setting of the CPU to the data-write-operation mode is made by operating a dip switch DS provided for the bar-code reader 1. Alternately, a mode-shift bar code may be provided for indicating a change to the data-write-operation mode. In this case, the mode-shift bar code may be fed into the bar-code reader 1 to inform the CPU 16 of a mode change, and, then, the special bar code indicating the stationary-detection mode may be fed into the bar code reader 1.

Alternately, the special bar code may be input from the POS system 19 to the bar-code reader 1 via the interface cable 18 and the interface circuit 17. Since the data of the special bar code is stored in the nonvolatile memory 21, the data will not be destroyed even when there is a power cut or the like.

Figure 4:
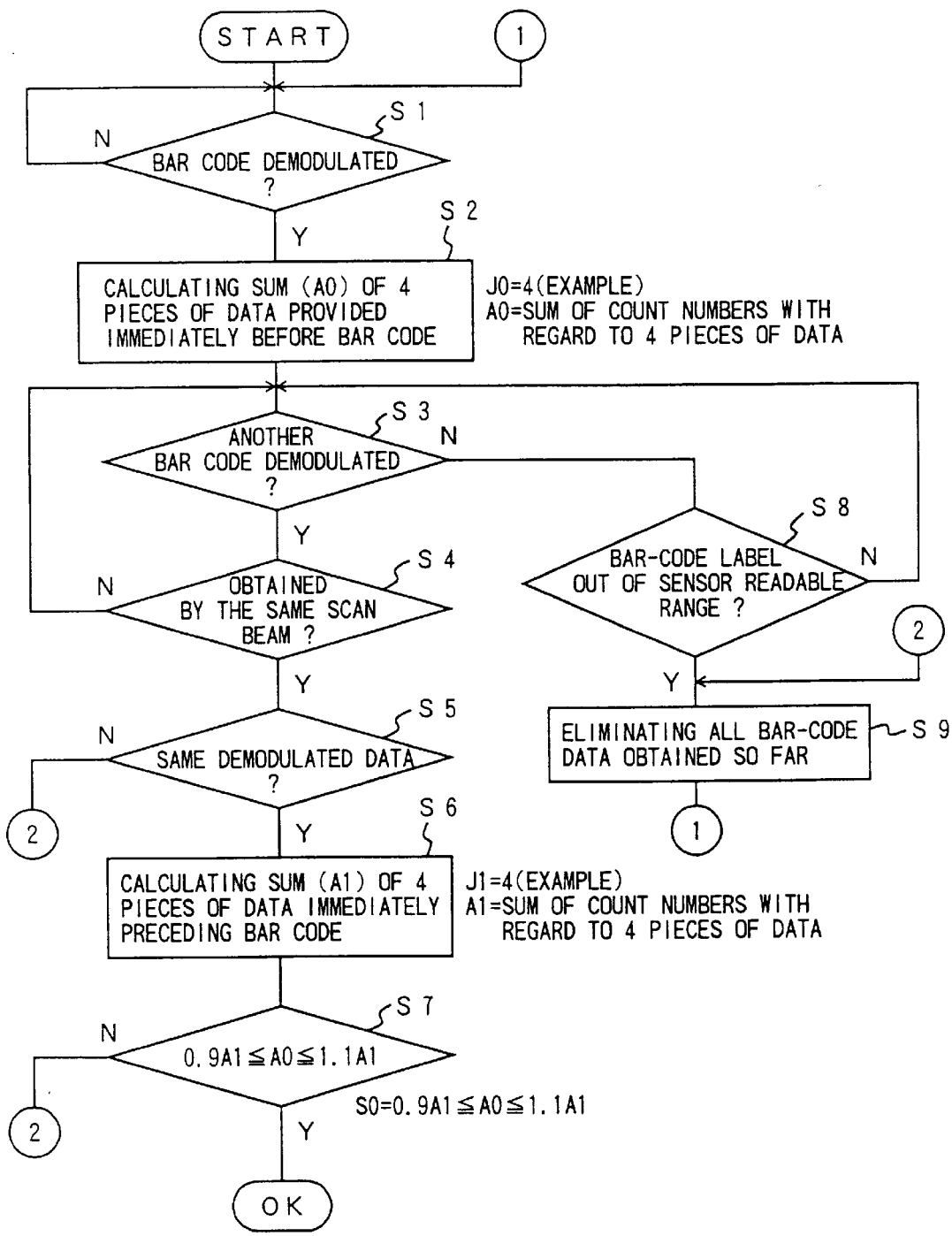
FIG. 4 is a flowchart of a process of reading a bar code according to an embodiment of the present invention.

As described above, the bar-code reader 1 is provided with the dip switch DS. The dip switch DS is used for setting the CPU 16 to the data-write-operation mode so as to store the special bar-code data in the nonvolatile memory 21 FIG. 4 is a flowchart of a process of reading a bar code according to an embodiment of the present invention.

At a step S1 immediately after a start of a read operation, a check is made whether a detected bar code is demodulated. If it is, the procedure goes to a step S2. Otherwise, the step S1 is repeated.

At the step S2, a sum (A0) of J0 pieces of data is calculated, where the J0 pieces of data are provided immediately before the demodulated bar code. In the example of FIG. 4, J0 is four, and A0 is a sum of the above-mentioned count numbers with respect to the four pieces of data.

In what follows, a description will be given with regard to the above-identified data immediately preceding the bar code.

A bar code is not surrounded by blank areas. First, margin portions complying with a relevant standard are provided in adjacent areas of the bar code. These margin portions are typically provided in a white color (i.e., a color which has a high reflectivity), and have a width defined by the relevant standard. Second, when the bar code is printed on a package or the like of a product, surrounding areas outside the margin portions may have various printed patterns and characters.

The above-identified data preceding the bar code is comprised of these margin portions, patterns, characters, shadows, etc., herein after referred to collectively as, variously, "surrounding patterns" and "patterns." In general, bar-code readers compare intensity of reflected light from bar codes with a reference level, and identifies black bars and white bars of the bar codes in accordance with the results of the comparison. This comparison is made not only for the bar codes, but also for surrounding patterns around the bar codes. The process at the step S2 is concerned with processing of these surrounding patterns.

Even when only a blank area is provided around a bar code without any printed pattern, some patterns are detected in portions thereof surrounding, i.e., before and/or after, the bar-code data. This is because of shadows, coherent characteristics of laser beams, etc.

It should be noted that a distinction between a bar code and surrounding patterns is easily made since the bar code has a special arrangement in compliance with a use standard.

With reference to FIG. 4 again, at a step S3, a check is made whether another bar code is demodulated. If it is, the procedure goes to a step S4. Otherwise, the procedure goes to a step S8.

At the step S4, a check is made whether the bar code demodulated at the step S1 and the bar code demodulated at the step S3 are obtained by the same scan beam. As shown in FIG. 3, the bar-code reader 1 emits the plurality of beams in different directions. In this device, one of the beams such as the beam B1 is allocated in advance as a beam to be used for reading a bar-code menu or the like. As previously described, the rotation sensor 23 provided for the polygon mirror 3 can be used for deciding which one of the beams is currently transmitted from the bar-code reader 1.

The "same scan beam", which is referred to in connection with the step S4, may mean the beam B1, for example, in the example of FIG. 3. Namely, the step S4 checks whether the bar code demodulated at the step S1 and the bar code demodulated at the step S3 are obtained by the same beam B1. If they are obtained by the same scan beam, the procedure goes to a step S5. Otherwise, the procedure goes back to the step S3.

At the step S5, a check is made whether the demodulated data obtained at the step S1 and the demodulated data obtained at the step S3 are the same. If they are not, it is ascertained that the two demodulated data are obtained as a result of demodulating two different bar codes. This indicates that there is a relative motion between the bar-code reader 1 and the bar code 7. In this case, the procedure goes to a step S9. If the two demodulated data are the same, the procedure goes to a step S6.

At the step S6, a sum (A1) of J1 pieces of data immediately preceding the bar code of the step S3 is calculated. In this example, J1 is four as in the step S2, and A1 is a sum of the count numbers with respect to the four pieces of the data.

At a step S7, a check is made whether a predetermined condition specifying a relation between A0 and A1 is satisfied. In detail, it is checked as to whether a condition $$0.9\ A1 \leq A0 \leq 1.1\ A1 \tag{1}$$

is met. If this condition is met, it is ascertained that the bar code is successfully read while the bar-code reader 1 has no movement relative to the bar code 7. If the condition (1) is not satisfied, the procedure goes to a step S9.

At the step S8 when it is decided that no bar code is demodulated at the step S3, a check is made whether the bar-code label (the bar code of the step S1 in particular) has gone out of the sensor readable range of the bar-code reader 1. This check can be made, for example, by looking into whether a data pattern obtained from a scan shows a sign of a bar code. Even if no bar code is demodulated, it is ascertained that the bar-code label has not yet gone out of the range as long as a pattern suspiciously resembling a bar code is obtained. In this case, the procedure goes back to the step S3. If the bar-code label has gone out of the range, the procedure goes to the step S9.

At the step S9, all the bar-code data obtained so far is eliminated, and a next read operation is started. This step S9 is performed when a decision has been made that the bar-code reader 1 is still moving relative to the bar code 7, and that the bar-code reader 1 has already passed over a first bar code.

The decision made at the step S7, on the other hand, is based on whether the sum of the count numbers with respect to the four pieces of data is the same between the two demodulated bar codes. If the bar-code reader 1 has relative movement, the sum of the four preceding pieces of data should exhibit a difference between the two demodulated bar codes. If the condition (1) is satisfied, on the other hand, the bar-code reader 1 should be in no motion relative to the bar code 7.

The condition (1) includes a tolerance range of ±10% in consideration of probable errors included in a data-read process. Alternately, a condition may be provided as:

$$A0=A1 \tag{2}$$

as having no tolerance range. Conversely, the tolerance range may be further enlarged to endure larger errors.

Figure 5:
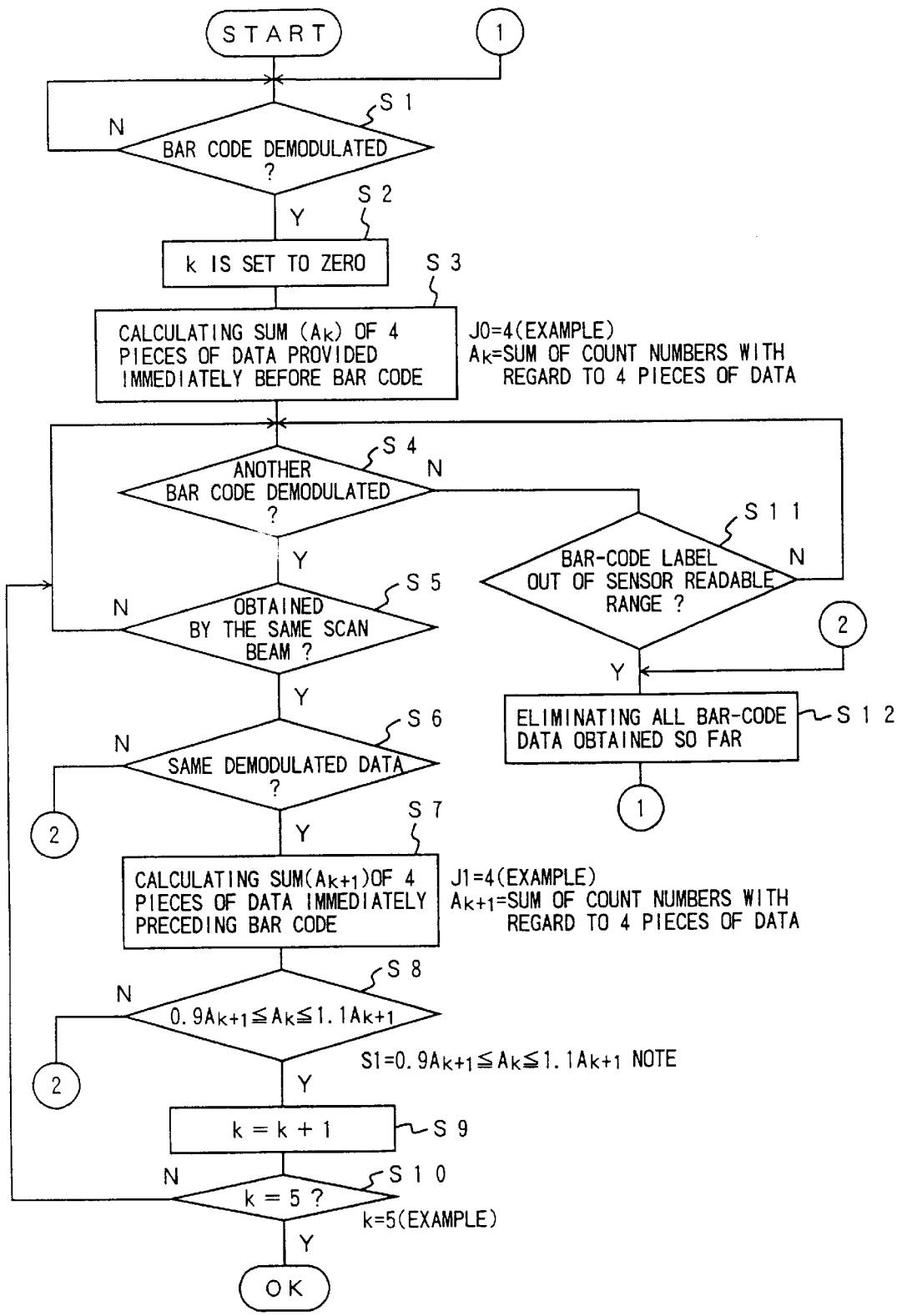
FIG. 5 is a flowchart of a process of reading a bar code according to another embodiment of the present invention.

FIG. 5 is a flowchart of a process of reading a bar code according to another embodiment of the present invention.

At a step S1 immediately after a start of a read operation, a check is made whether a detected bar code is demodulated. At a step S2, k is set to 0. At a step S3, a sum (Ak) of J0 (e.g., four) pieces of data is calculated, where the J0 pieces of data immediately precede the demodulated bar code. This calculation is the same as that of FIG. 4.

At a step S4, a check is made whether another bar code is demodulated. If it is, the procedure goes to a step S5, where a check is made whether the bar code demodulated at the step S1 and the bar code demodulated at the step S4 are obtained by the same scan beam. If they are obtained in different scans, the procedure goes back to the step S4.

If the two bar codes are obtained by the same scan beam, the procedure goes to a step S6, where a check is made whether the demodulated data obtained at the step S1 and the demodulated data obtained at the step S4 are the same. If they are not, the procedure goes to a step S12.

If the two demodulated data are the same, the procedure goes to a step S7, where a sum (Ak+1) of J1 (e.g., four) pieces of data immediately preceding the bar code of the step S4 is calculated. At a step S8, a check is made whether a predetermined condition specifying a relation between Ak and Ak+1 is satisfied. In detail, it is checked as to whether a condition $$0.9\ Ak+1 \leq Ak \leq 1.1\ Ak+1 \tag{3}$$

is met. If the condition (3) is not satisfied, it is ascertained that the bar-code reader 1 is in relative motion against the bar code 7, and the procedure goes to a step S12. If the condition (3) is met, the procedure goes to a step S9, where k is set to k+1. At a step S10, a check is made whether k is equal to 5. If it is, this means that the steps S4 through S8 are repeated five times. In this case, it is ascertained that the read operation has been successful.

If k has not yet reached 5 at the step S10, the procedure goes back to the step S4.

In the previous embodiment of FIG. 4, the read operation is regarded as a success when the sum of data pieces preceding a bar code satisfies a predetermined condition. In the embodiment of FIG. 5, however, the read operation is regarded as a success only when five sums satisfy a predetermined condition. That is, stricter conditions are imposed in the case of FIG. 5. In other words, the embodiment of FIG. 5 can offer higher reliability than the embodiment of FIG. 4.

Ak used in the condition (3) at the step S8 may be replaced by any one of A0 through Ak−1 previously obtained. A due consideration has to be given, however, to maintaining the same conditions over a series of checks. To this end, a substitute for Ak in the condition (3) should be the same over the series of checks. This is because use of different values over the series of checks at the step S8 may result in propagation of errors, which undermine the reliability of the read operation.

Figure 6:
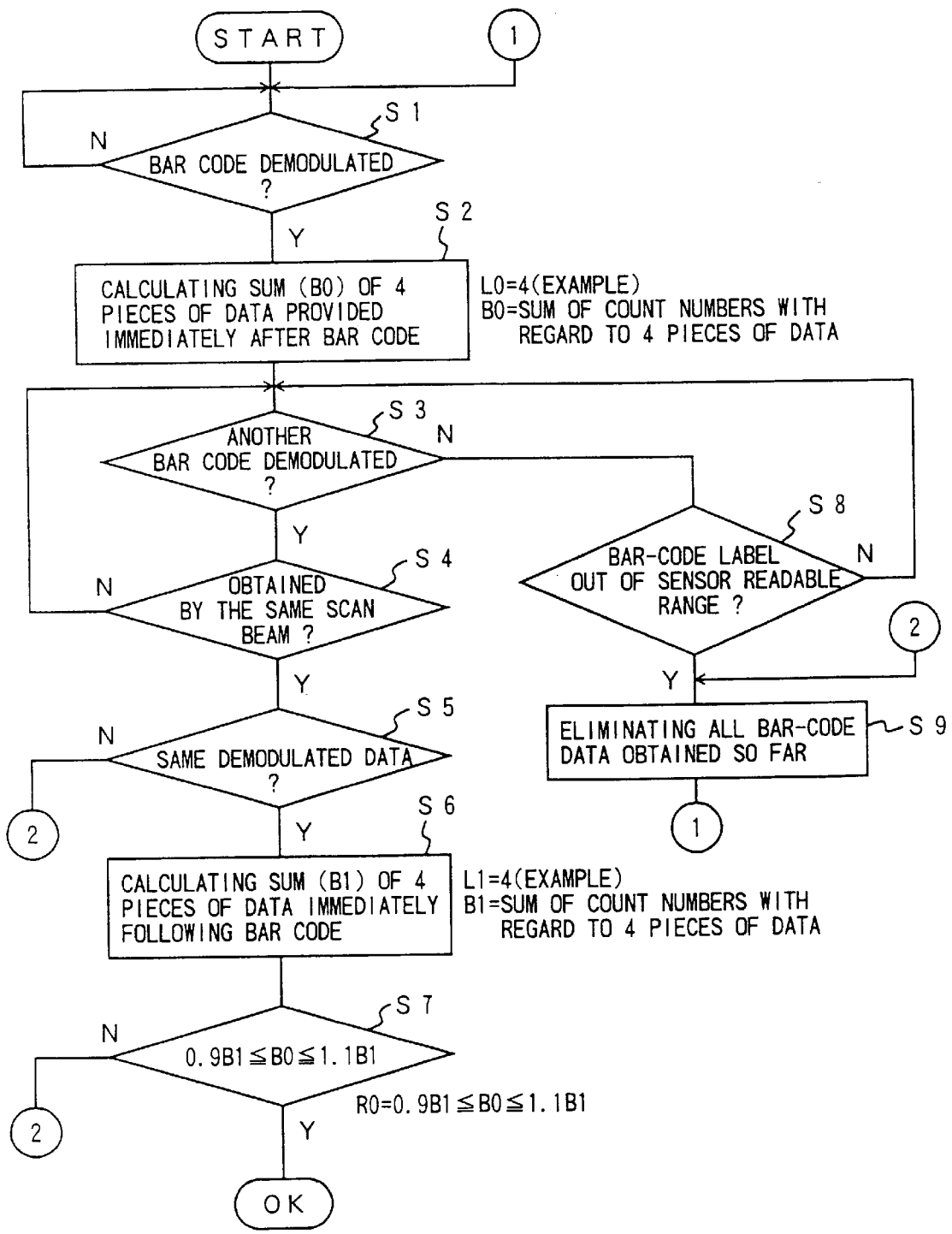
FIG. 6 is a flowchart of a process of reading a bar code according to yet another embodiment of the present invention.

FIG. 6 is a flowchart of a process of reading a bar code according to yet another embodiment of the present invention. The process of FIG. 6 is a variation of that of FIG. 4. In FIG. 4, a sum of count numbers is obtained with respect to pieces of data immediately preceding the demodulated data. In FIG. 6, on the other hand, a sum of count numbers is obtained in respect to data pieces immediately following the demodulated data.

At a step S1 immediately after a start of a read operation, a check is made whether a detected bar code is demodulated. If it is, the procedure goes to a step S2. Otherwise, the step S1 is repeated.

At the step S2, a sum (B0) of L0 pieces of data is calculated, where the L0 pieces of data are provided immediately after the demodulated bar code. In the example of FIG. 6, L0 is four, and B0 is a sum of count numbers with respect to the four pieces of data.

At a step S3, a check is made whether another bar code is demodulated. If it is, the procedure goes to a step S4. Otherwise, the procedure goes to a step S8.

At the step S4, a check is made whether the bar code demodulated at the step S1 and the bar code demodulated at the step S3 are obtained by the same scan beam. If they are obtained by the same scan beam, the procedure goes to a step S5. Otherwise, the procedure goes back to the step S3.

At the step S5, a check is made whether the demodulated data obtained at the step S1 and the demodulated data obtained at the step S3 are the same. If they are not, it is ascertained that the two demodulated data are obtained as a result of demodulating two different bar codes. In this case, the procedure goes to a step S9. If the two demodulated data are the same, the procedure goes to a step S6.

At the step S6, a sum (B1) of L1 pieces of data immediately following the bar code of the step S3 is calculated. In this example, L1 is four as in the step S2, and B1 is a sum of the count numbers with respect to the four pieces of the data.

At a step S7, a check is made whether a predetermined condition specifying a relation between B0 and B1 is satisfied. In detail, it is checked as to whether a condition $$0.9\ B1 \leq B0 \leq 1.1\ B1 \tag{4}$$

is met. If this condition is met, it is ascertained that the bar code is successfully read while the bar-code reader 1 has no movement relative to the bar code 7. If the condition (1) is not satisfied, the procedure goes to a step S9.

At the step S8 when it is decided that no bar code is demodulated at the step S3, a check is made whether the bar-code label has gone out of the sensor readable range of the bar-code reader 1. This check can be made, for example, by looking into whether a data pattern obtained from a scan shows a sign of a bar code. Even if no bar code is demodulated, it is ascertained that the bar-code label has not yet gone out of the range as long as a pattern suspiciously resembling a bar code is obtained. In this case, the procedure goes back to the step S3. If the bar-code label has gone out of the range, the procedure goes to the step S9.

At the step S9, all the bar-code data obtained so far is eliminated, and a next read operation is started. This step S9 is performed when a decision has been made that the bar-code reader 1 is still moving relative to the bar code 7, and that the bar-code reader 1 has already passed over a first bar code.

The condition (4) includes a tolerance range of ±10% in consideration of probable errors included in a data-read process. Alternately, a condition may be provided as:

$$B0 = B1 \tag{5}$$

as having no tolerance range. Conversely, the tolerance range may be further enlarged to endure larger errors.

Figure 7:
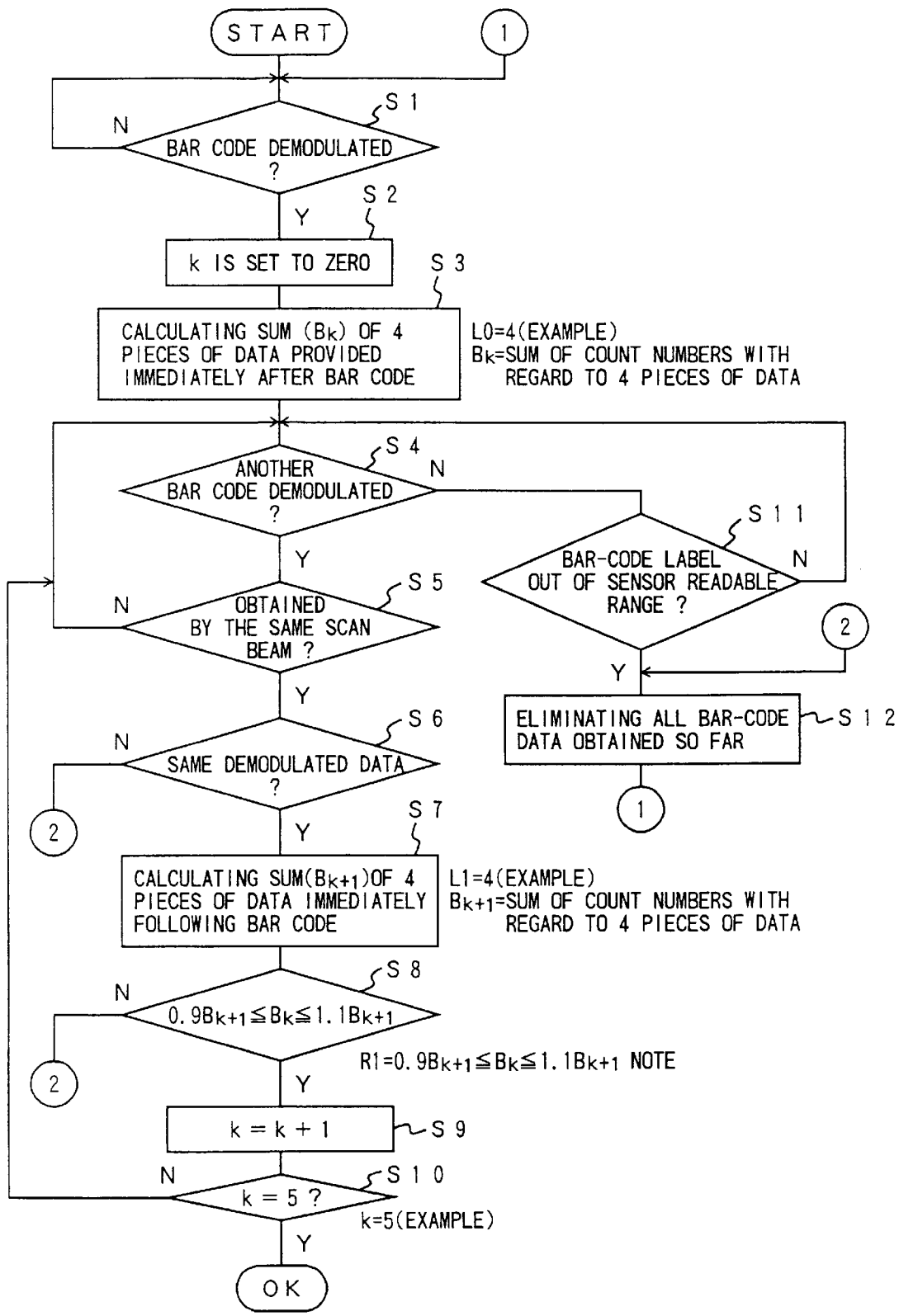
FIG. 7 is a flowchart of a process of reading a bar code according to still another embodiment of the present invention.

FIG. 7 is a flowchart of a process of reading a bar code according to still another embodiment of the present invention. The process of FIG. 7 is a variation of that of FIG. 5. In FIG. 5, a sum of count numbers is obtained with respect to pieces of data immediately preceding the demodulated data. In FIG. 7, on the other hand, a sum of count numbers is obtained in respect to data pieces immediately following the demodulated data.

At a step S1 immediately after a start of a read operation, a check is made whether a detected bar code is demodulated. At a step S2, k is set to 0. At a step S3, a sum (Bk) of L0 (e.g., four) pieces of data is calculated, where the L0 pieces of data immediately follow the demodulated bar code.

At a step S4, a check is made whether another bar code is demodulated. If it is, the procedure goes to a step S5, where a check is made whether the bar code demodulated at the step S1 and the bar code demodulated at the step S4 are obtained by the same scan beam. If they are obtained in different scans, the procedure goes back to the step S4.

If the two bar codes are obtained by the same scan beam, the procedure goes to a step S6, where a check is made whether the demodulated data obtained at the step S1 and the demodulated data obtained at the step S4 are the same. If they are not, the procedure goes to a step S12.

If the two demodulated data are the same, the procedure goes to a step S7, where a sum (Bk+1) of L1 (e.g., four) pieces of data immediately following the bar code of the step S4 is calculated. At a step S8, a check is made whether a predetermined condition specifying a relation between Bk and Bk+1 is satisfied. In detail, it is checked as to whether a condition $$0.9\ Bk{+}1 \leq Bk \leq 1.1\ Bk{+}1 \tag{6}$$

is met. If the condition (6) is not satisfied, it is ascertained that the bar-code reader 1 is in relative motion against the bar code 7, and the procedure goes to a step S12. If the condition (6) is met, the procedure goes to a step S9, where k is set to k+1. At a step S10, a check is made whether k is equal to 5.

If it is, this means that the steps S4 through S8 are repeated five times. In this case, it is ascertained that the read operation has been successful.

If k has not yet reached 5 at the step S10, the procedure goes back to the step S4.

Bk used in the condition (6) at the step S8 may be replaced by any one of B0 through Bk−1 previously obtained. A due consideration has to be given, however, to maintaining the same conditions over a series of checks. To this end, a substitute for Bk in the condition (6) should be the same over the series of checks. This is because use of different values over the series of checks at the step S8 may result in propagation of errors, which undermine the reliability of the read operation.

Figure 8:
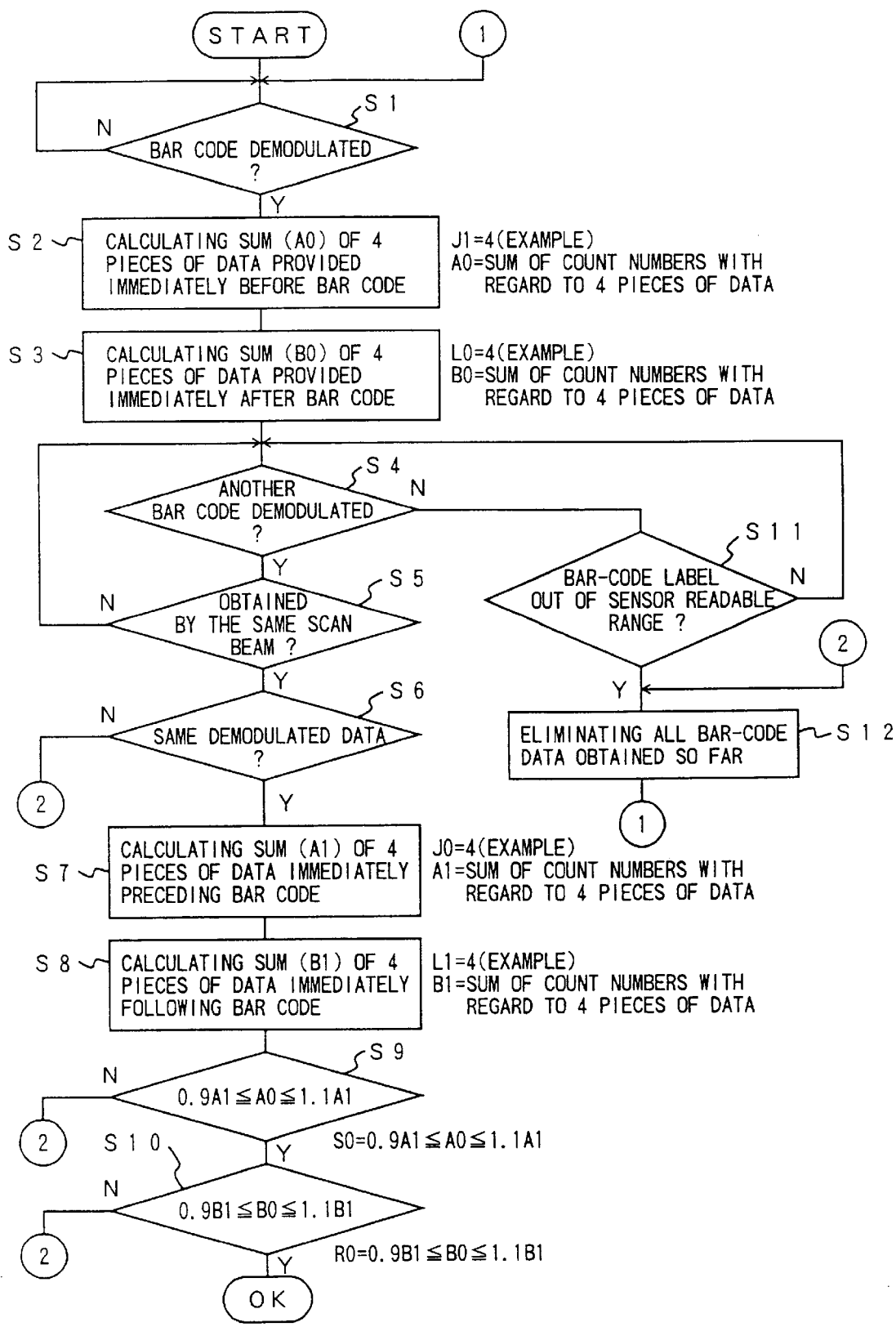
FIG. 8 is a flowchart of a process of reading a bar code according to a further embodiment of the present invention.

FIG. 8 is a flowchart of a process of reading a bar code according to a further embodiment of the present invention. The embodiment of FIG. 8 is a combination of the embodiment shown in FIG. 4 and the embodiment shown in FIG. 6. In this embodiment shown in FIG. 8, a sum of data lengths is obtained with respect to each of data sets provided before and after a bar code. Based on the sums of the respective data sets, a check is made as to whether the bar-code reader is in relative motion against a bar code, thereby enhancing reliability of the data-read operation.

At a step S1 immediately after a start of a read operation, a check is made whether a detected bar code is demodulated. If it is, the procedure goes to A step S2. Otherwise, the step S1 is repeated.

At the step S2, a sum (A0) of count numbers is calculated with respect to J1 (e.g., four) pieces of data, which are provided immediately before the demodulated bar code. At a step S3, a sum (B0) of count numbers is calculated with respect to L0 (e.g., four) pieces of data, which are provided immediately after the demodulated bar code.

At a step S4, a check is made whether another bar code is demodulated. If it is not, the procedure goes to a step S11, where a check is made whether the bar-code label has gone out of the scan range. If the bar-code label has gone out of the scan range, it is ascertained that the bar-code reader 1 is in motion relative to the bar code 7. In this case, the procedure goes to a step S12, where all the data obtained so far is discarded, and a next read operation is started.

If it turns out at the step S4 that another bar code is demodulated, the procedure goes to a step S5, where a check is made whether the bar code demodulated at the step S1 and the bar code demodulated at the step S4 are obtained by the same scan beam. If they are obtained by the same scan beam, the procedure goes to a step S6. Otherwise, the procedure goes back to the step S4.

At the step S6, a check is made whether the demodulated data obtained at the step S1 and the demodulated data obtained at the step S4 are the same. If they are not, it is ascertained that the two demodulated data are obtained as a result of demodulating two different bar codes. In this case, the procedure goes to a step S12. If the two demodulated data are the same, the procedure goes to a step S7.

At the step S7, a sum (A1) of J0 (e.g., four) pieces of data immediately preceding the bar code of the step S4 is calculated. At a step S8, a sum (B1) of L1 (e.g., four) pieces of data immediately following the bar code of the step S4 is calculated.

At a step S9, a check is made whether a predetermined condition specifying a relation between A0 and A1 is satisfied. In detail, it is checked as to whether a condition $$0.9\ A1 \leq A0 \leq 1.1\ A1 \tag{7}$$

is met. If this condition is not satisfied, it is ascertained that the bar-code reader 1 has movement relative to the bar code 7, and the procedure goes to a step S12. If the condition (7) is met, the procedure goes to a step S10.

At a step S10, a check is made whether a predetermined condition specifying a relation between B0 and B1 is satisfied. In detail, it is checked as to whether a condition $$0.9\ B1 \leq B0 \leq 1.1\ B1 \tag{8}$$

is met. If this condition is not satisfied, the procedure goes to the step S12. If the condition (8) is satisfied, this means that the bar-code reader 1 stands still relative to the bar code 7, indicating a success completion of the read operation.

As described above, according to the embodiment of FIG. 8, the count numbers of the two data sets provided before and after the bar code are checked as to whether the predetermined conditions are satisfied, so that double checks are enforced in deciding whether the bar-code reader shows movement relative to the bar code. Because of this, the bar-code data obtained in this embodiment is highly reliable.

In FIG. 8, an order in which the steps S7 through S10 are performed may vary. For example, the step S9 may be performed immediately after the step S7 and before the step S8. This arrangement allows the step S8 to be skipped if the condition of the step S9 is not satisfied. By the same token, the order of the entire procedure may be changed without requiring modification to each step.

Figure 9:
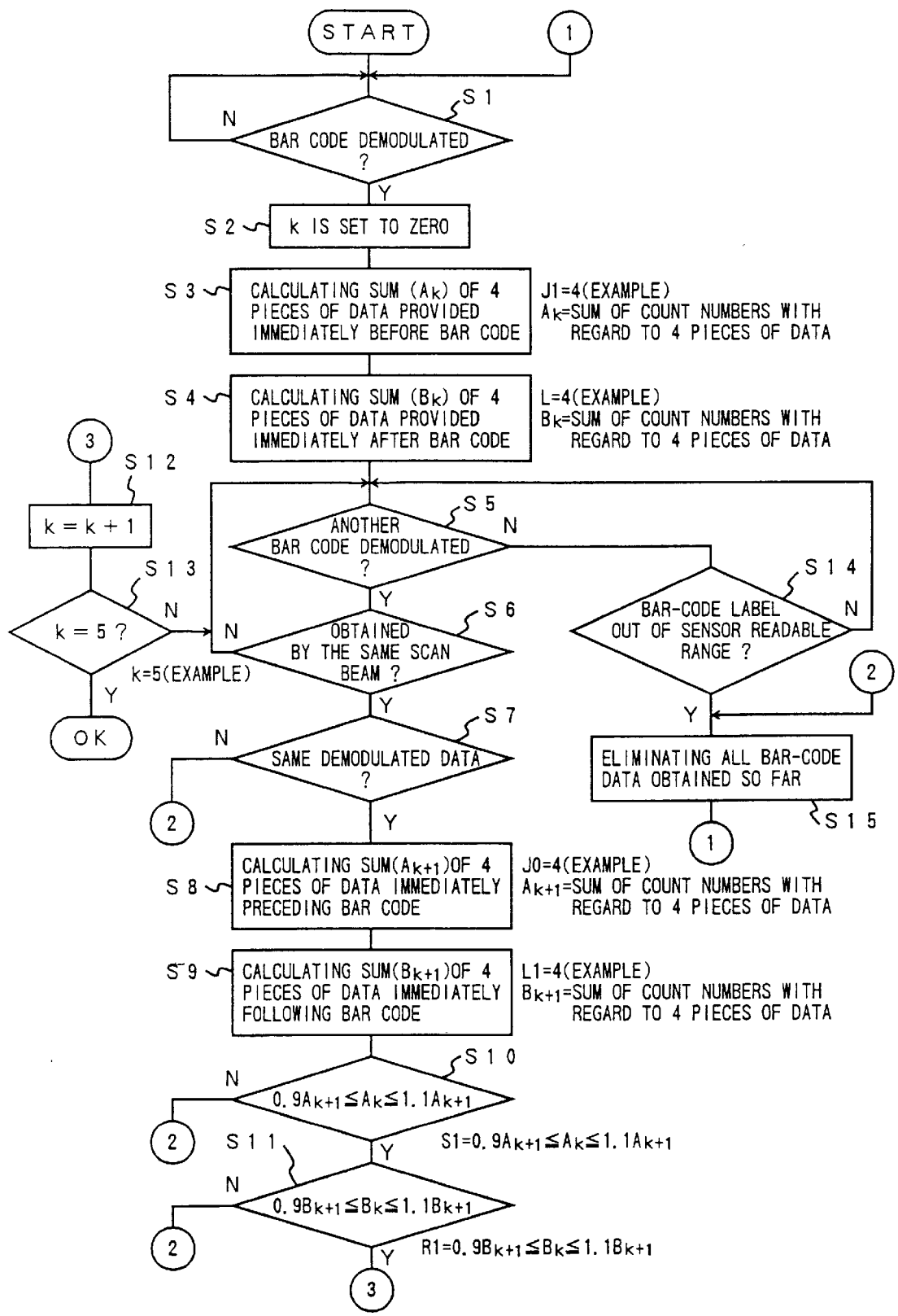
FIG. 9 is a flowchart of a process of reading a bar code according to a yet further embodiment of the present invention.

FIG. 9 is a flowchart of a process of reading a bar code according to a yet further embodiment of the present invention. The embodiment of FIG. 9 is a combination of the embodiment shown in FIG. 5 and the embodiment shown in FIG. 7.

At a step S1 immediately after a start of a read operation, a check is made whether a detected bar code is demodulated. At a step S2, k is set to 0. At a step S3, a sum (Ak) of count numbers is calculated with respect to J1 (e.g., four) pieces of data, which immediately precede the demodulated bar code. At a step S3, a sum (Bk) of count numbers is calculated with respect to L0 (e.g., four) pieces of data, which immediately follow the demodulated bar code.

At a step S5, a check is made whether another bar code is demodulated. If it is not, the procedure goes to a step S14, where a check is made whether the bar-code label has gone out of the scan range. If it has not, the procedure goes back to the step S5. If the bar-code label has gone out of the scan range, it is ascertained that the bar-code reader 1 is in motion relative to the bar code 7. In this case, the procedure goes to a step S15, where all the data obtained so far is discarded, and a next read operation is started.

If it turns out at the step S5 that another bar code is demodulated, the procedure goes to a step S6, where a check is made whether the bar code demodulated at the step S1 and the bar code demodulated at the step S5 are obtained by the same scan beam. If they are obtained by the same scan beam, the procedure goes to a step S7. Otherwise, the procedure goes back to the step S5.

At the step S7, a check is made whether the demodulated data obtained at the step S1 and the demodulated data obtained at the step S5 are the same. If they are not, the procedure goes to the step S15, with an assumption that the bar-code reader 1 and the bar code 7 are in relative motion. If the two demodulated data are the same, the procedure goes to a step S8.

At the step S8, a sum (Ak+1) of count numbers is calculated with respect to J0 (e.g., four) pieces of data immediately preceding the bar code of the step S5. At the step S9, a sum (Bk+1) of count numbers is calculated with respect to L1 (e.g., four) pieces of data immediately following the bar code of the step S5.

At a step S10, a check is made whether a predetermined condition specifying a relation between Ak and Ak+1 is satisfied. In detail, it is checked as to whether a condition $$0.9\, Ak+1 \leq Ak \leq 1.1\, Ak+1 \quad (9)$$

is met. If this condition is not satisfied, the procedure goes to the step S15. If the condition (9) is met, the procedure goes to a step S11.

At the step S11, a check is made whether a predetermined condition specifying a relation between Bk and Bk+1 is satisfied. In detail, it is checked as to whether a condition $$0.9\, Bk+1 \leq Bk \leq 1.1\, Bk+1 \quad (10)$$

is met. If this condition is not satisfied, the procedure goes to the step S15. If the condition (10) is satisfied, the procedure goes to a step S12.

At the step S12, k is incremented by 1. At a step S13, a check is made whether k is equal to 5. If it is, i.e., if the checks on the count numbers are made five times, this means that the bar-code reader 1 and the bar code 7 exhibit no relative motion, indicating a successful completion of the read operation. If k is smaller than 5, the procedure goes back to the step S5, and repeats the following steps.

Figure 10:
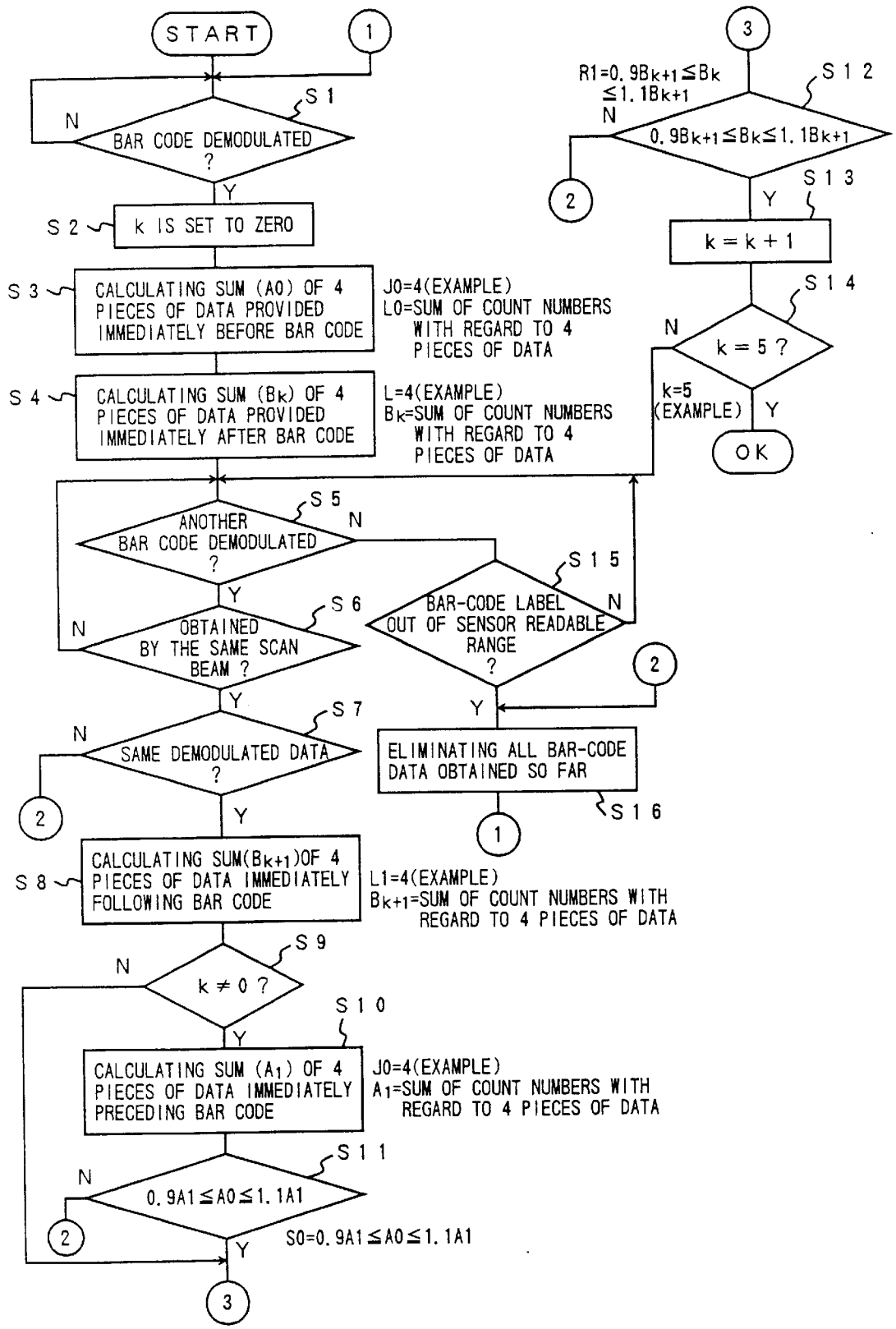
FIG. 10 is a flowchart of a process of reading a bar code according to a variation of the embodiment of FIG. 9.

FIG. 10 is a flowchart of a process of reading a bar code according to a variation of the embodiment of FIG. 9. In the embodiment of FIG. 9, the sum of data pieces is calculated at the steps S8 and S9, respectively, with respect to data sets provided before and after the demodulated bar code of the step S5.

In order to reduce the amount of processing time required for the read operation, it is preferable to omit as many steps as possible. In the embodiment of FIG. 10, the steps S8 through S11 are provided in a different order from that of FIG. 9.

In FIG. 10, a step S8 is performed after it turns out at a step S7 that the same demodulated data as the previous data is obtained. At the step S8, a sum (Bk+1) of count numbers is obtained with respect to four data pieces provided immediately after the bar code. At a step S9, a check is made whether k is zero.

If k is zero, this means that a check has not been made with respect to the sums of the data pieces provided before and after the bar code, wherein the check is to compare these sums between the demodulated data of the step S1 and the demodulated data of the step S5. In this case, the procedure goes to a step S12 by skipping steps S10 and S11. At the step S12, a check is made whether the sum (Bk) obtained for the first demodulated data and the sum (Bk+1) obtained for the second demodulated data satisfy a predetermined condition. Namely, a sum (A1) of the data pieces immediately preceding the second demodulated data is not calculated in this case.

If k is not zero, this means that a check has already been made at least once with check results indicating that the sum of data pieces immediately following the bar code is the same between the first demodulated data and the second demodulated data. In this case, the procedure goes to the step S10, where a sum of count numbers is obtained with respect to four data pieces immediately preceding the bar code. Then, at the step S11, a check is made whether the sum obtained for the first demodulated data and the sum obtained for the second demodulated data satisfy a predetermined condition.

Figure 11:
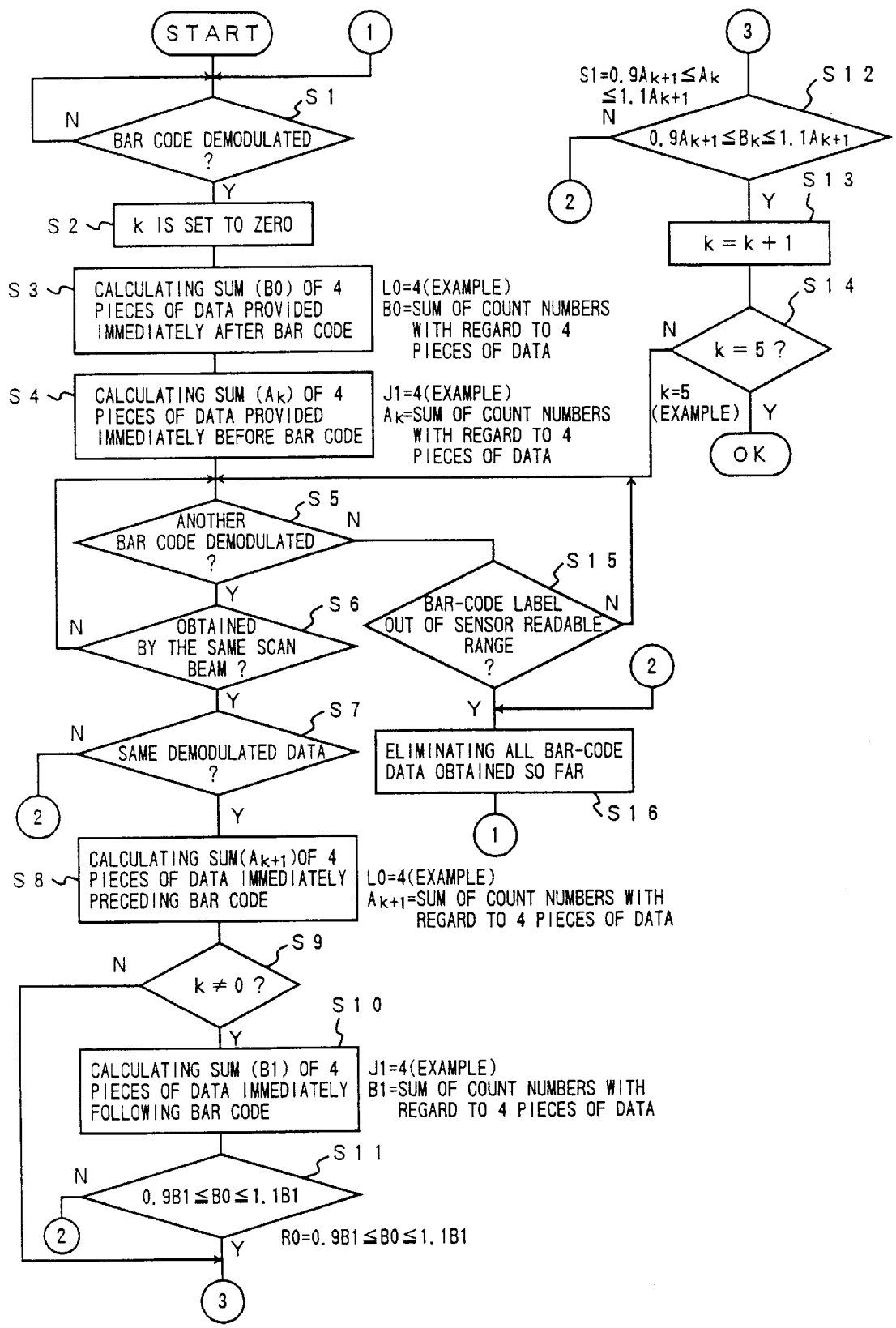
FIG. 11 is a flowchart of a process of reading a bar code according to a variation of the embodiment of FIG. 10.

FIG. 11 is a flowchart of a process of reading a bar code according to a variation of the embodiment of FIG. 10. In FIG. 11, data processing of data pieces immediately preceding the second bar code and data processing of data pieces immediately following the second bar code are exchanged with each other. Other steps are the same as those of FIG. 10, and a description thereof will be omitted.

Figure 12:
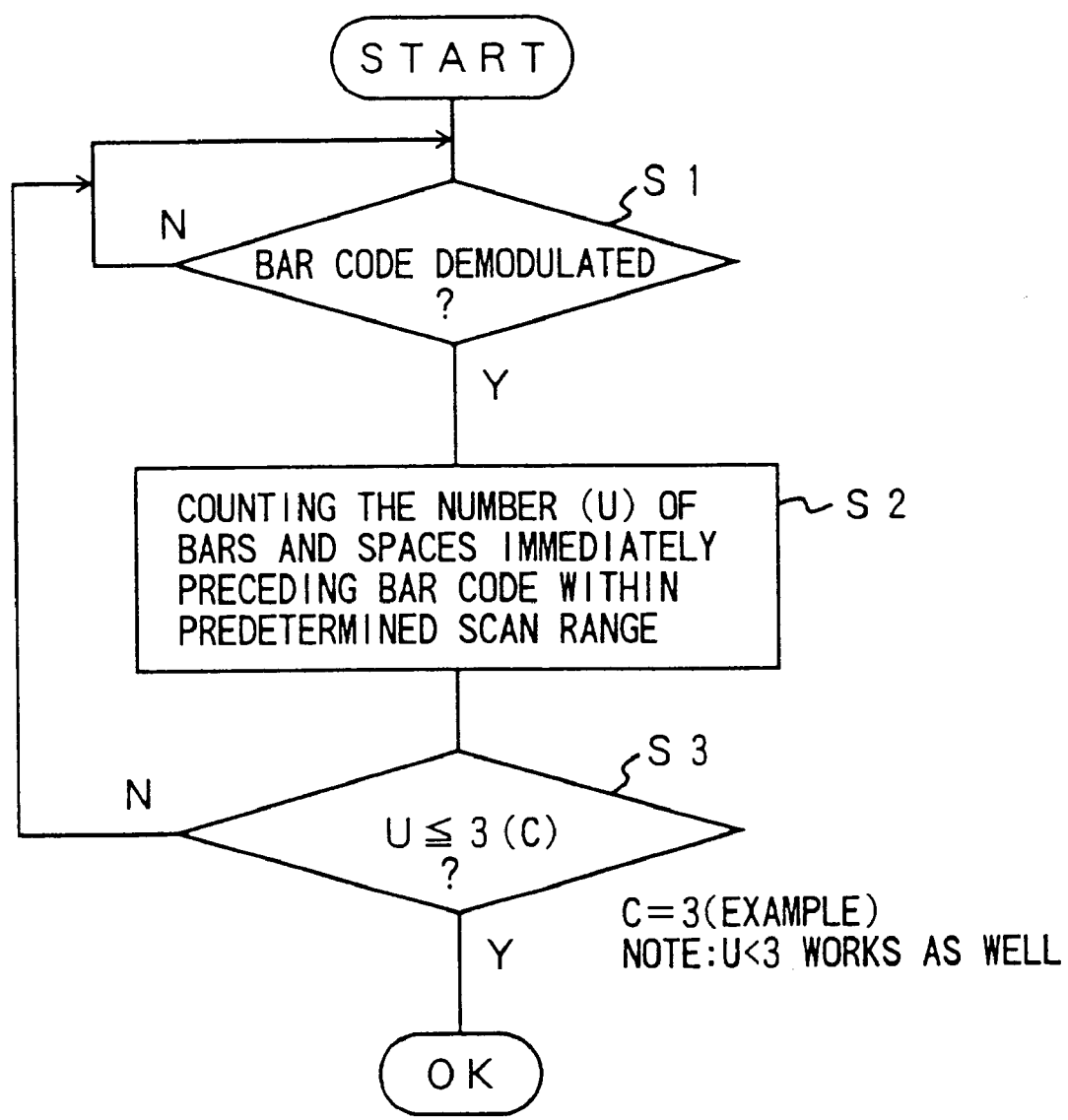
FIG. 12 is a flowchart of a process which forms a core portion of the following embodiments.

FIG. 12 is a flowchart of a process which forms a core portion of the following embodiments.

At a step S1, a check is made whether a bar code is demodulated.

At a step S2, the number U of detected, "effective" bars and spaces immediately preceding the bar code is counted within a predetermined scan range. Here, bars refer to black what are detected as stripes of the bar code, and spaces refer to what are detected as white stripes of the bar code (i.e., patterns what are detected as effective bar code stripes and spaces). Also, the predetermined scan range is a scan range of a scan beam which is used for scanning the bar code demodulated at the step S1.

In bar-code readers, a motor sensor as shown in FIG. 1 can provide an indication as to what range is being scanned by a scan beam emitted by the bar-code reader. When a plurality of scan beams are emitted one by one, an indication is provided as to which one of the scan beam is being emitted and what range is being scanned by the emitted scan beam. In other words, it is possible to define a scan range as required at the step S2, because it is easy to check whether a scan beam is scanning the predetermined scan range.

At a step S3, a check is made whether the number U obtained at the step S2 is smaller than or equal to a predetermined number C (C=3 in the example of FIG. 12). If the number U exceeds the number C, the procedure goes back to the step S1 to repeat the described steps.

If the number U is no bigger than C, the read operation is regarded as having finished in success.

As previously described, effective bars and spaces surrounding the bar code data are detected because there exist shadows, coherent characteristics of laser beams, and the like when there is only a blank area around the bar code. Under some controlled circumstances, it is possible to place a limit, which the number of effective bars and spaces detected, despite the lack of any surrounding printed patterns, does not exceed. Use of such a limit allows a decision to be made as to whether the bar code and the bar-code reader are in relative motion. Further, a predetermined number of bars and spaces may be printed on the left side and the right side of a bar code for the purpose of making an easier decision.

Figure 13:
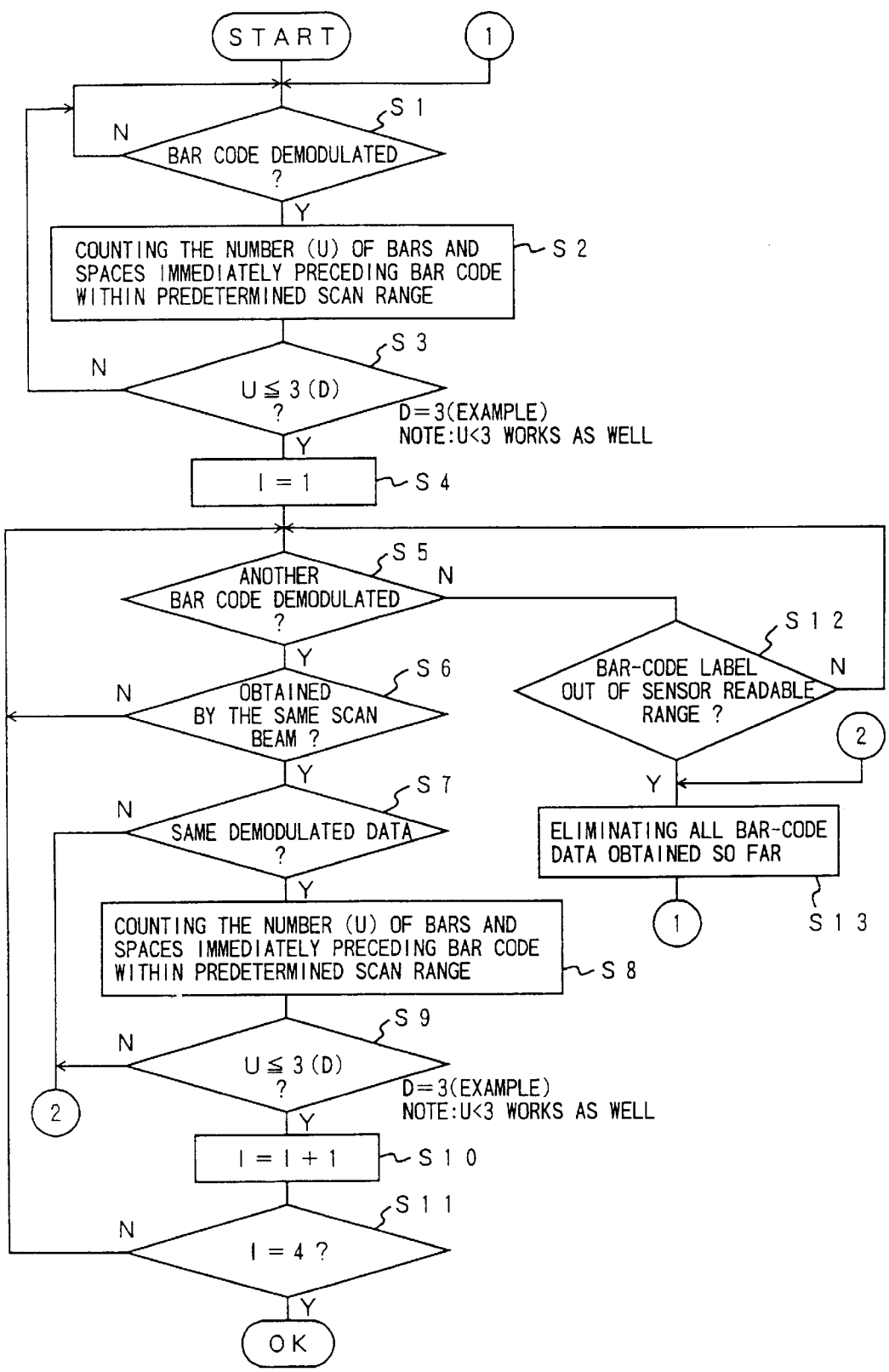
FIG. 13 is a flowchart of a process of reading a bar code according to another embodiment of the present invention.

FIG. 13 is a flowchart of a process of reading a bar code according to another embodiment of the present invention. In FIG. 13, the procedure of FIG. 12 is incorporated.

Steps S1 through S3 of FIG. 13 are the same as the steps of FIG. 12.

At a step S4, I is set to 1.

At a step S5, a check is made whether another bar code is demodulated. If it is not, the procedure goes to a step S12, where a check is made whether a bar-code label has gone out of the sensor readable range. One may assume that a bar code of this bar-code label is the bar code which is demodulated at the step S1.

If it turns out at the step S12 that the bar-code label has not gone out of the range, the procedure goes back to the step S5. This case can be regarded as an indication that the bar code demodulated at the step Si still remains in the sensor readable range despite a failure of an attempt to demodulate the bar code the second time due to some reasons such as errors involved in the modulation process. In this case, therefore, it is ascertained that the bar-code reader 1 and the bar code 7 are stationary relative to each other.

If it turns out at the step S12 that the bar-code label has gone out of the range, it is ascertained that the bar-code reader 1 is in relative motion with respect to the bar code 7, and the procedure goes to a step S13. At the step S13, all the data obtained so far is discarded, and the procedure goes to the step S1 to start a next read operation.

If the step S5 indicates that another bar code is demodulated, the procedure goes to a step S6, where a check is made whether the bar codes demodulated at the steps S1 and S5 are obtained by the same scan (e.g., scanned by the same scan beam scanning the same area). This is an appropriate check point when the read operation requires that a particular beam be used for reading a bar-code menu. If the bar codes are not obtained by the same scan beam, the procedure goes back to the step S5 since required conditions for reading a bar-code menu are not satisfied.

If the step S6 indicates that the bar codes are obtained by the same scan beam, the procedure goes to a step S7. At the step S7, a check is made whether the demodulated data of the step S1 is the same as the demodulated data of the step S5. This check is made based on a straightforward comparison between the two sets of data.

If the two sets of data are not the same, this means that the bar code demodulated at the step S1 is a different bar code from that of the step S5. In this case, the procedure goes to the step S13 since the bar-code reader 1 is believed to be moving relative to the bar code 7.

If the two sets of data are the same, the procedure goes to a step S8. At the step S8, the number U of bars and spaces immediately preceding the bar code is obtained within the predetermined scan range. This step performs substantially the same process as the step S2.

At a step S9, a comparison is made to decide whether the number U obtained at the step S8 is smaller or equal to a predetermined number D (e.g., 3). If the number U exceeds the number D, the procedure goes to the step S13.

If the number U is no larger than the number D, I is incremented by 1 at a step S10. At a step S11, a check is made whether I is equal to 4. If it is, this means that the demodulated data is obtained four times while the number U is no larger than 3 in each case. It is ascertained, therefore, that the bar-code reader 1 exhibits no movement relative to the bar code 7, and that the read operation has successfully ended. If I is not equal to 4, on the other hand, this means that there is not sufficient data to find that the bar-code reader 1 is in no motion relative to the bar code 7. In this case, therefore, the procedure goes back to the step S5 to repeat the steps following the step S5.

Figure 14:
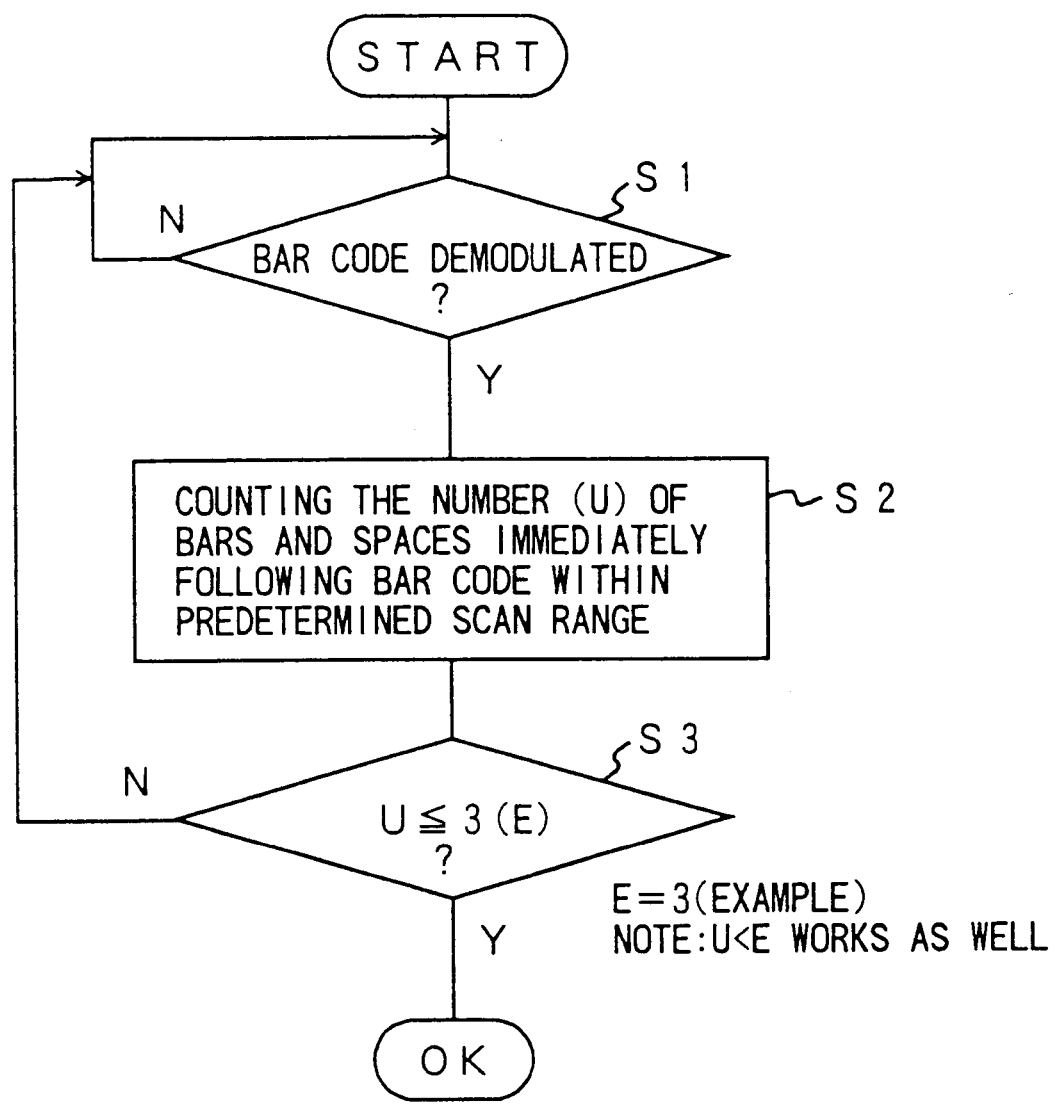
FIG. 14 is a flowchart showing a variation of the embodiment of FIG. 12.

FIG. 14 is a flowchart showing a variation of the embodiment of FIG. 12. The process of FIG. 14 differs from that of FIG. 12 only in the following point. That is, the process of FIG. 12 obtains the number U of the bars and spaces immediately preceding the bar code, whereas the process of FIG. 14 obtains the number of bars and spaces immediately following the bar code. In the process of FIG. 14, the obtained number is compared with a predetermined number E (e.g., 3).

Figure 15:
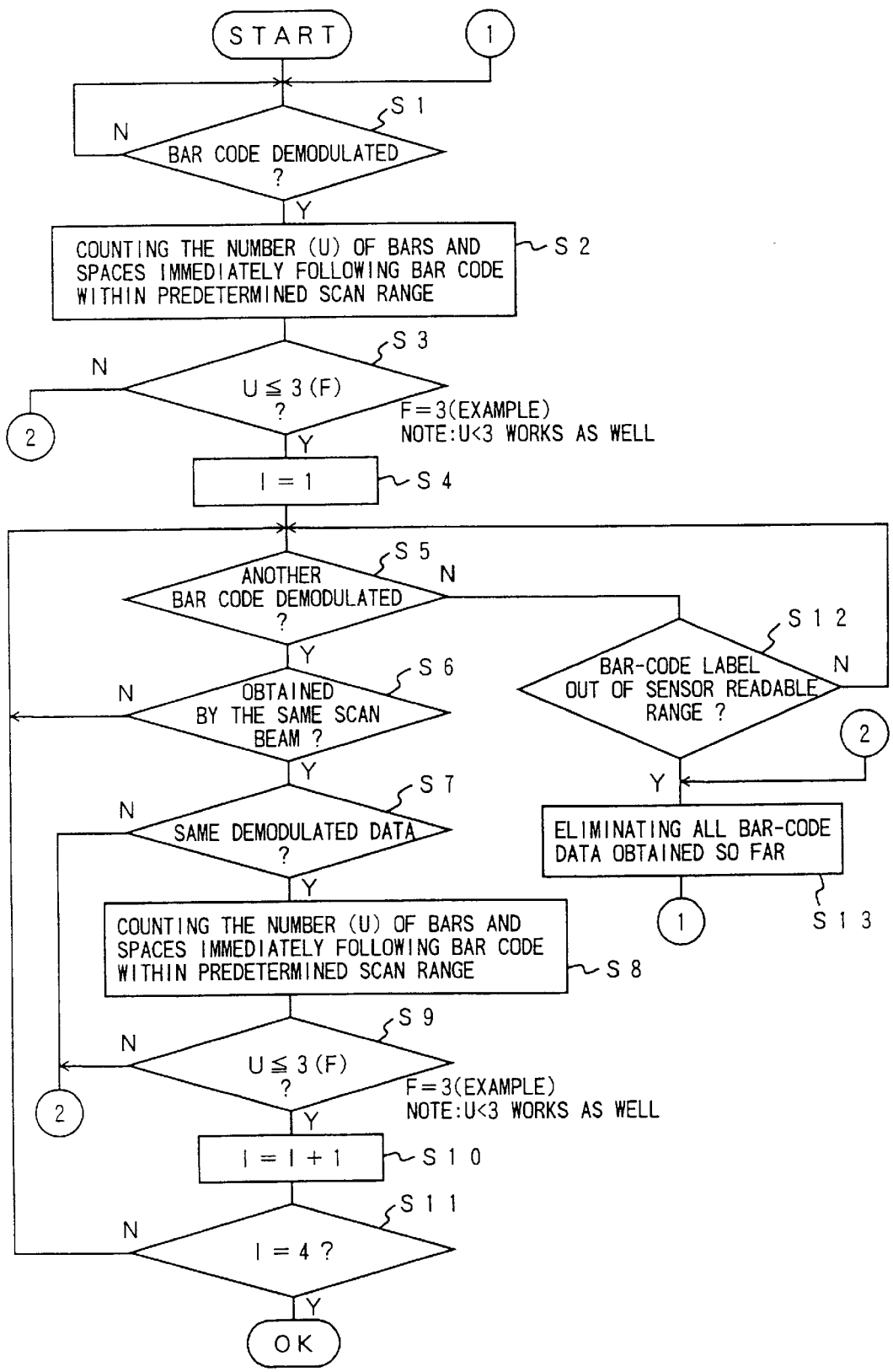
FIG. 15 is a flowchart of a process of reading a bar code according to a variation of the embodiment of FIG. 13.

FIG. 15 is a flowchart of a process of reading a bar code according to a variation of the embodiment of FIG. 13. The process of FIG. 15 differs from that of FIG. 13 only in the following point. That is, the process of FIG. 13 obtains the number U of the bars and spaces immediately preceding the bar code, whereas the process of FIG. 15 obtains the number of bars and spaces immediately following the bar code. In the process of FIG. 15, the obtained number is compared with a predetermined number F (e.g., 3).

Figure 16:
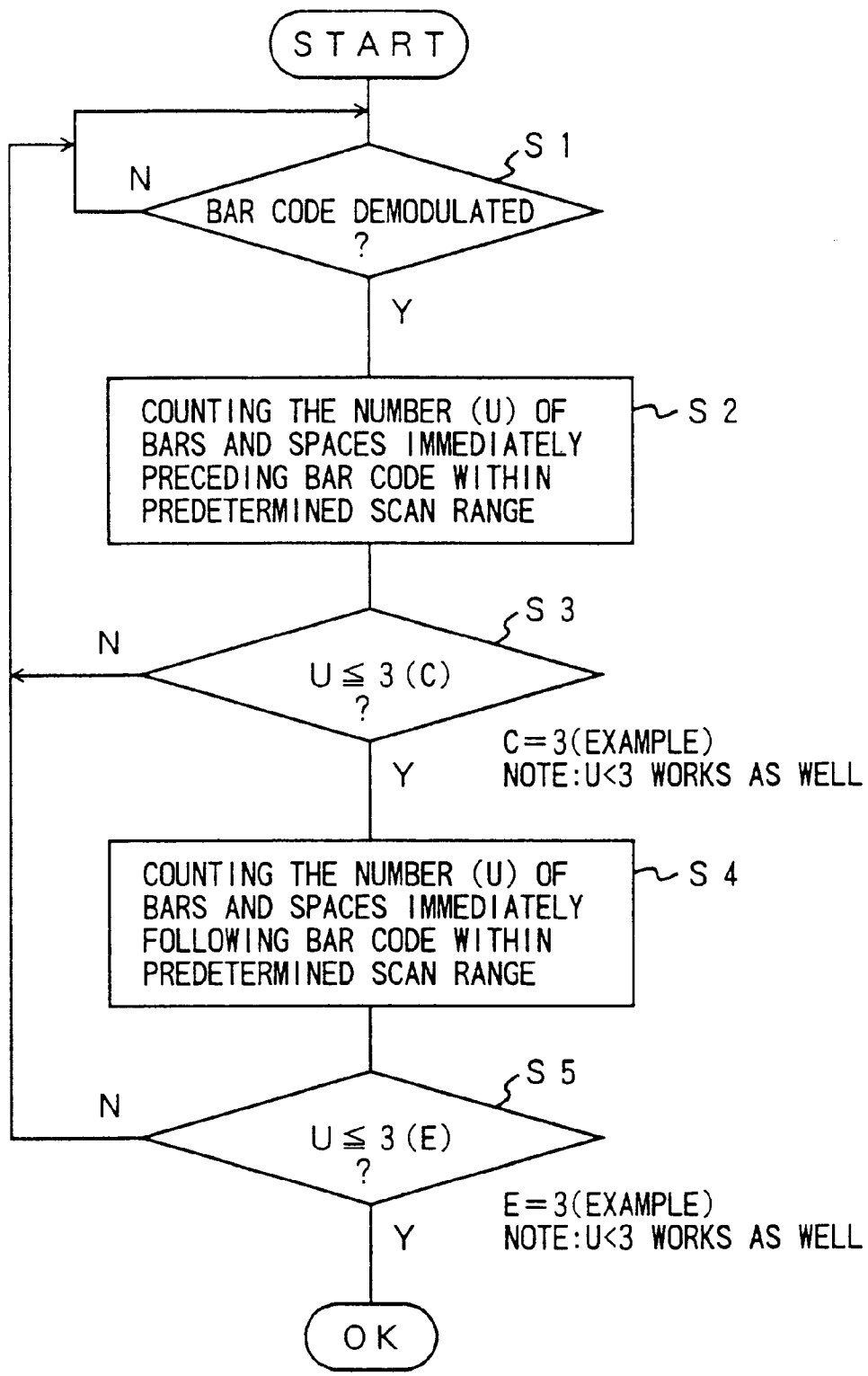
FIG. 16 is a flowchart of a process which is a combination of the process of FIG. 12 and the process of FIG. 14.

FIG. 16 is a flowchart of a process which is a combination of the process of FIG. 12 and the process of FIG. 14. In the process of FIG. 12 or FIG. 14, the number of bars and spaces is taken into consideration with respect to only one side of the bar code, i.e., a side before the bar code or a side after the bar code. However, relative movement between the bar-code reader and the bar code is not restricted to one direction, but exhibits a 2-dimensional shift. Use of the number of bars and spaces on one side of the bar code may not be sufficient for the purpose of finding the relative movement.

The process of FIG. 16 copes with this problem. In FIG. 16, the number of bars and spaces is obtained with respect to each side of the bar code. If it is appropriate to assume that relative movement between the bar-code reader and the bar code brings about an increase in the number of bars and spaces on at least one side of the bar code, the process of FIG. 16 should provide an appropriate check on the relative movement. In the process of FIG. 12 or FIG. 14, on the other hand, a change in the number of bars and spaces may be overlooked if this change takes place on the side which is not monitored.

In FIG. 16, a step S1 makes a check as to whether a bar code is demodulated, and, then, a step S2 calculates the number U of bars and spaces immediately preceding the demodulated bar code within a predetermined scan range. At a step S3, the number U is compared with a predetermined number C (e.g., 3). If the number U does not exceed the number C, it is ascertained that the required condition for reading a bar code is not satisfied, and the procedure goes back to the step S1.

If the number U is no larger than the number C, a step S4 calculates the number U of bars and spaces immediately following the bar code within the predetermined range. At a step S5, the number U is compared with a predetermined number E (e.g, 3) to decide which one of the numbers is greater than the other.

If the number U is no greater than the number E, it is ascertained that the read operation has completed in success. If the number U is greater than E, it is ascertained that the required condition for reading the bar code is not satisfied, and the procedure goes back to the step S1 to repeat the above-mentioned steps.

It should be noted that the steps S2 through S5 may be provided in a different order.

Figure 17:
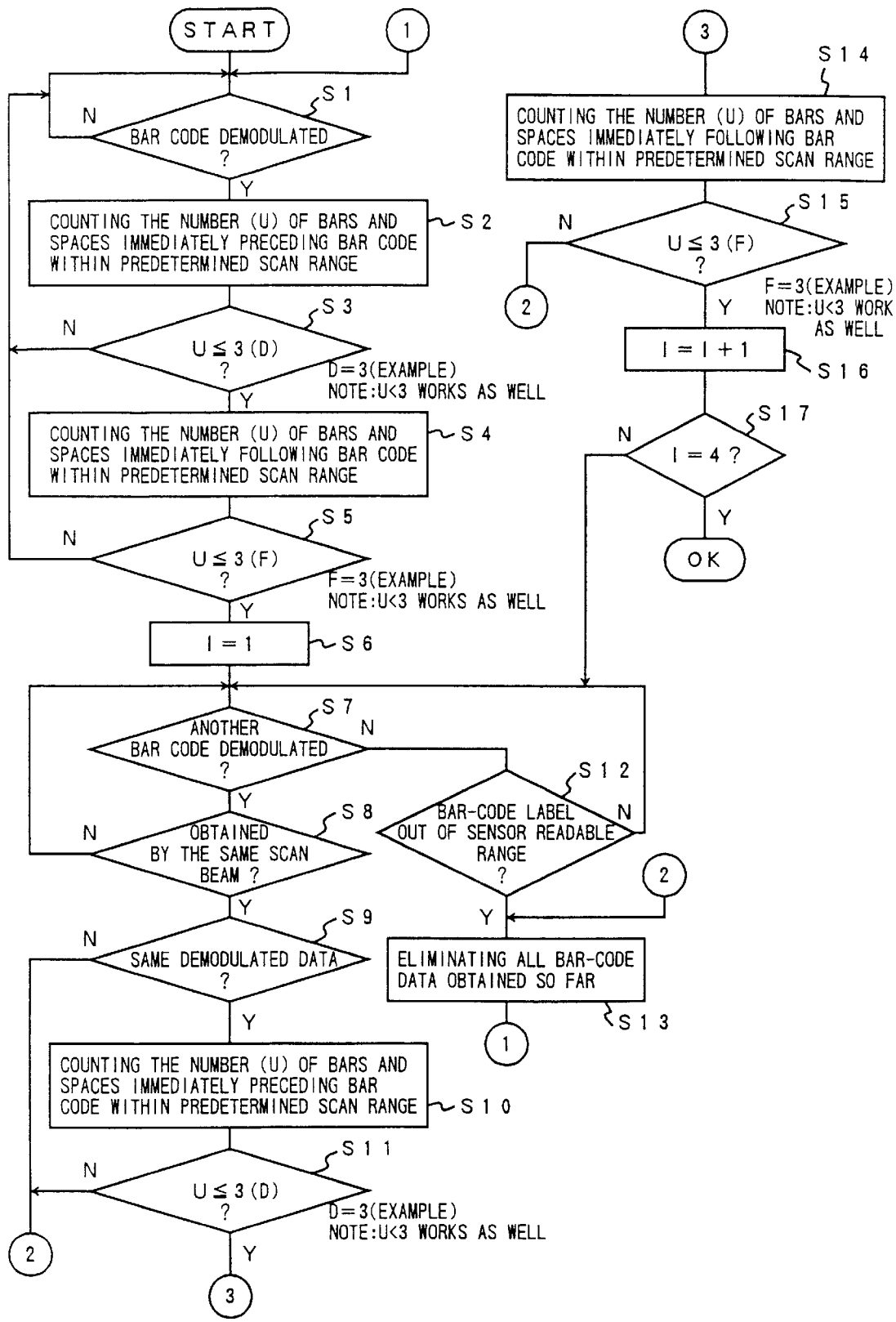
FIG. 17 is a flowchart of a process of reading a bar code according to another embodiment of the present invention.

FIG. 17 is a flowchart of a process of reading a bar code according to another embodiment of the present invention. The embodiment of FIG. 17 incorporates the process of FIG. 16.

After a start of the read operation, a step S1 makes a check as to whether a bar code is demodulated. A step S2 obtains the number U of bars and spaces immediately preceding the demodulated bar code within a predetermined scan range. At a step S3, the number U is compared with a predetermined number D (e.g., 3) to determine which one of the numbers is greater than the other.

If the number U exceeds the number D, the procedure goes back to the step S1. In the number U is not greater than the number D, the procedure goes to a step S4, where the number U of bars and spaces immediately following the bar code is obtained within the predetermined range. At a step S5, the number U is compared with a predetermined number F (e.g, 3) to decide which one of the numbers is greater than the other.

If the number U is greater than F, the procedure goes back to the step S1. If the number U is not greater than the number F, I is set to 1 at a step S6.

At a step S7, a check is made whether another bar code is demodulated, i.e., whether a bar code different from that of step S1 is obtained. If it is not, the procedure goes to a step S12, where a check is made whether a bar-code label has gone out of the sensor readable range. If it turns out at the step S12 that the bar-code label has not gone out of the range, the procedure goes back to the step S7.

If it turns out at the step S12 that the bar-code label has gone out of the range, it is ascertained that the bar-code reader 1 is in relative motion with respect to the bar code 7, and the procedure goes to a step S13. At the step S13, all the data obtained so far is discarded, and the procedure goes to the step S1 to start a next read operation.

If the step S7 indicates that another bar code is demodulated, the procedure goes to a step S8, where a check is made whether the bar codes demodulated at the steps S1 and S7 are obtained by the same scan beam. If the bar codes are not obtained by the same scan beam, the procedure goes back to the step S7.

If the step S8 indicates that the bar codes are obtained by the same scan beam, the procedure goes to a step S9. At the step S9, a check is made whether the demodulated data of the step S1 is the same as the demodulated data of the step S7. If the two sets of data are not the same, the procedure goes to a step S13 since the bar-code reader 1 is believed to be moving relative to the bar code 7.

If the two sets of data are the same, the procedure goes to a step S10. At the step S10, the number U of bars and spaces immediately preceding the bar code of the step S7 is obtained within the predetermined scan range.

At a step S11, a comparison is made to decide whether the number U obtained at the step S10 is smaller or equal to a predetermined number D (e.g., 3). If the number U exceeds the number D, the procedure goes to the step S13. If the number U is no larger than the number D, the procedure goes to a step S14.

At a step S14, the number U of bars and spaces immediately following the bar code of the step S7 is obtained within the predetermined scan range. At a step S15, a comparison is made to decide whether the number U obtained at the step S14 is greater than a predetermined number F (e.g., 3).

If the number U exceeds the number F, the procedure goes to the step S13. If the number U is no larger than the number F, the procedure goes to a step S16, where I is incremented by 1. At a step S17, a check is made whether I is equal to 4.

If it is, this means that the demodulated data is obtained four times while the number U is no larger than 3 in each case with respect to both sides of the bar code. It is ascertained, therefore, that the bar-code reader I exhibits no movement relative to the bar code 7, and that the read operation has successfully ended. If I is not equal to 4, on the other hand, this means that there is not sufficient data to find that the bar-code reader 1 is in no motion relative to the bar code 7. In this case, therefore, the procedure goes back to the step S7 to repeat the steps following the step S7.

In this manner, a plurality of data checks are conducted in the process of FIG. 17, so that check results regarding relative movement between the bar-code reader and the bar code are more reliable that in the case of FIG. 14.

Figure 18:
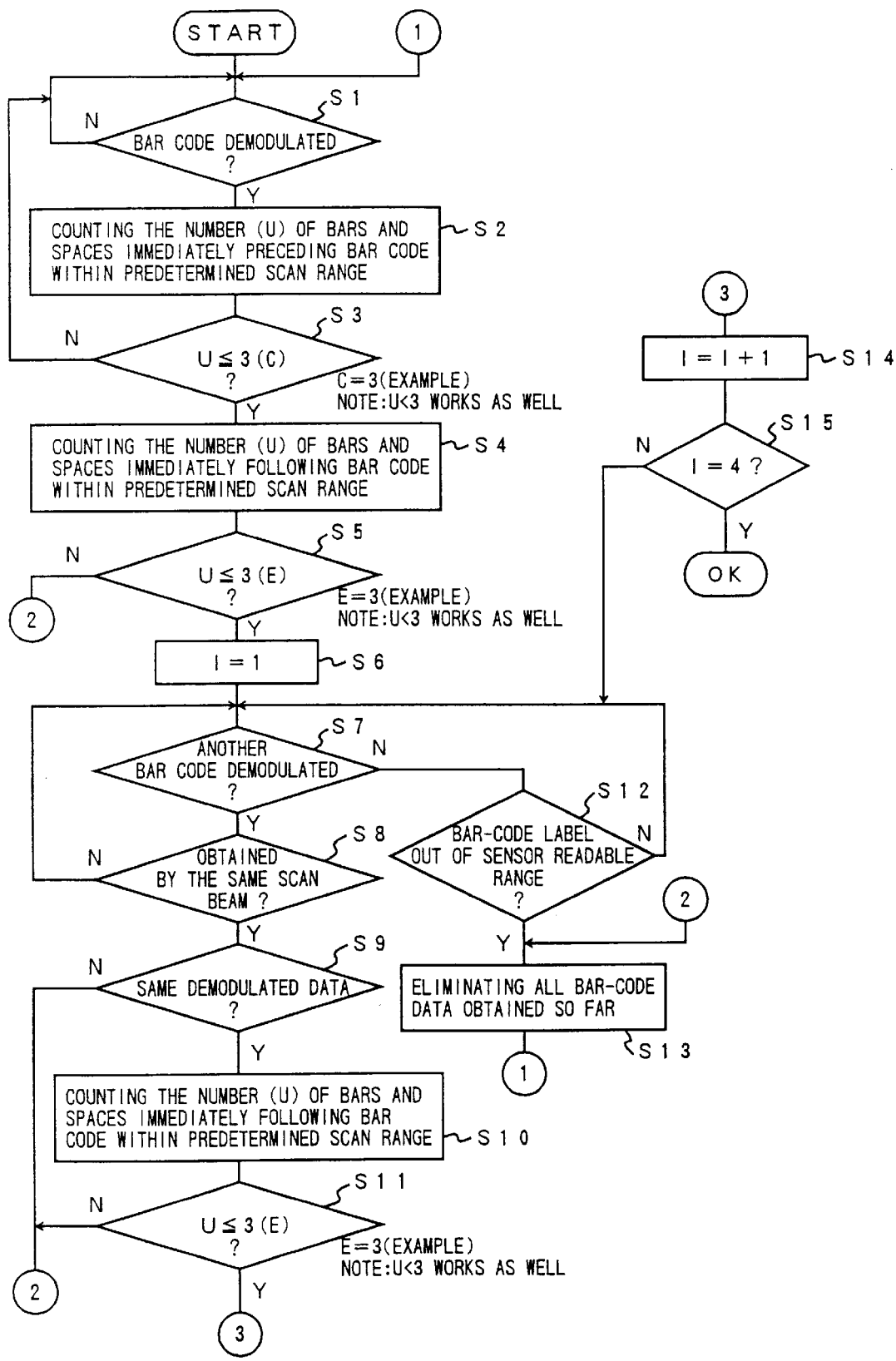
FIG. 18 is a flowchart of a process of reading a bar code according to a variation of the embodiment of FIG. 17.
Figure 19:
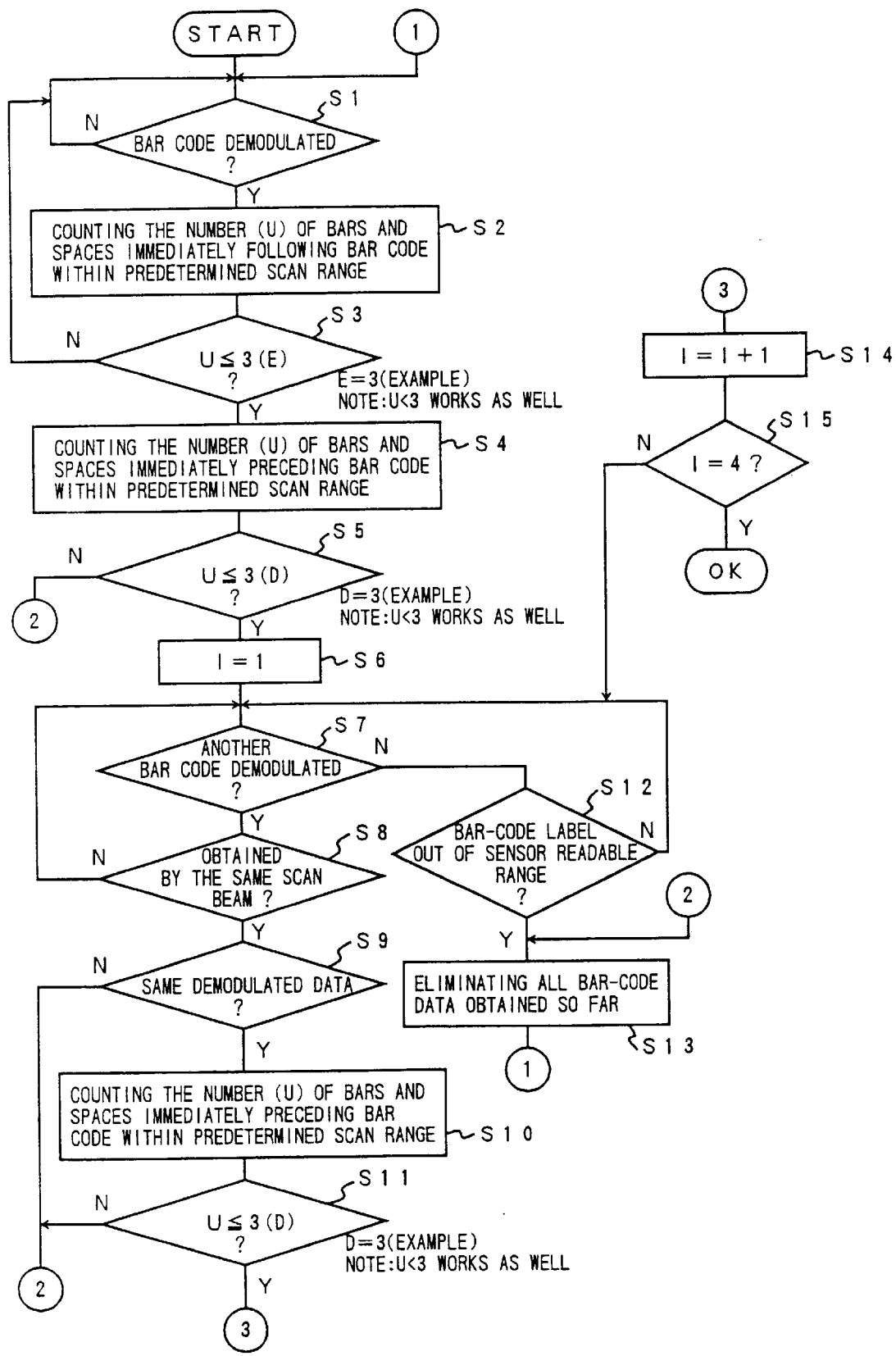
FIG. 19 is a flowchart of a process of reading a bar code according to a variation of the embodiment of FIG. 17.

FIG. 18 is a flowchart of a process of reading a bar code according to a variation of the embodiment of FIG. 17. In FIG. 18, the number of bars and spaces immediately preceding and following a bar code is obtained when the bar code is demodulated for the first time, but only a portion following a bar code is taken into account in counting the number of bars and spaces when bar codes are demodulated at the second and following occasions. In the same manner, FIG. 19 is a flowchart of a process of reading a bar code according to a variation of the embodiment of FIG. 17, and shows a case in which only a portion immediately preceding bar codes is taken into account when these bar codes are obtained by demodulation at the second and following circumstances.

Figure 20:
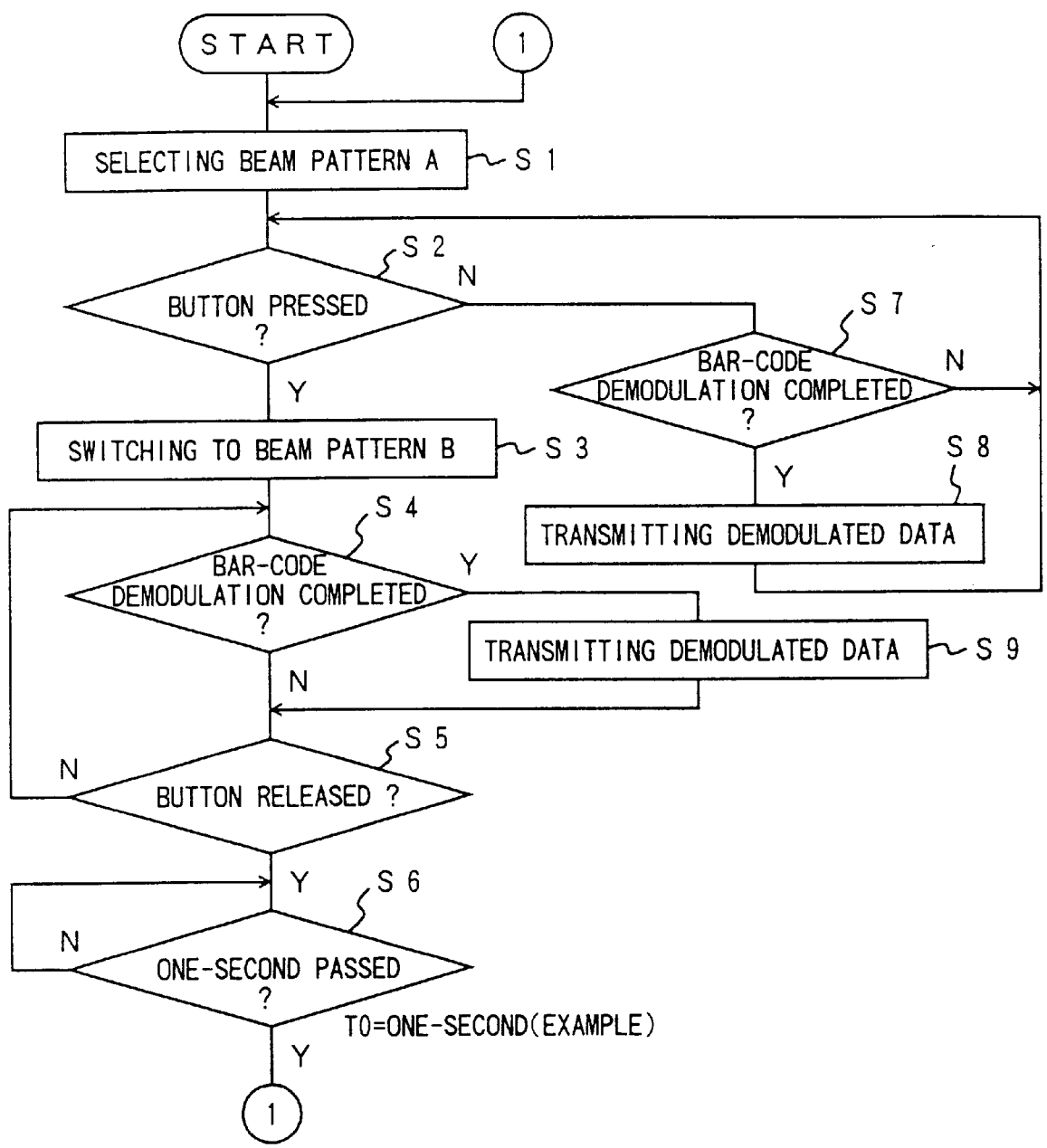
FIG. 20 is a flowchart of a process of reading a bar code according to another embodiment of the present invention.

FIG. 20 is a flowchart of a process of reading a bar code according to another embodiment of the present invention. This embodiment employs a bar-code reader which emits two types of beam patterns A and B. For example, the beam pattern A is suitable when the bar-code reader is used as a fixedly mounted device, and is comprised of a plurality of scan beams emitted in multiple directions from the scan window. Here, the scan pattern of multiple directions preferably cross each other. On the other hand, the beam pattern B is suited for the purpose of reading bar-code menus or the like, and is comprised of only one scan beam emitted in one direction from the scan window, or may include additional scan beams which are parallel to that scan beam.

At the time when bar codes are read in a normal operation, the bar-code reader emits the beam pattern A.

At a step S1, upon a start of the operation of the bar-code reader, the beam pattern A is selected so as to emit the beam pattern A from the scan window of the bar-code reader.

The bar-code reader is provided with a button for switching the beam pattern. This button is provided at a convenient position on the bar-code reader as shown in FIG. 2 such that the button is easy to operate when the bar-code reader is held in a hand.

At a step S2, a check is made whether the button is pressed. The operator of the bar-code reader presses the button when the operator wishes to read a bar code on a bar-code menu.

When the button is not pressed, the procedure goes to a step S7, where a check is made as to whether demodulation of a bar code is completed. If it is not completed, the procedure goes back to the step S2 to monitor the button status. If the demodulation is completed, the procedure goes to a step S8, where the demodulated data is transmitted. In this case, the bar-code reader does not have to be motionless relative to the bar code, so that no check is made with regard to the movement of the bar-code reader.

At a step S3 when the button is pressed at the step S2, the beam pattern B is selected so that a scan beam is emitted from the scan window only in one direction. At a step S4, a check is made whether demodulation of a bar code is finished. If it is finished, the procedure goes to a step S9, where the demodulated data is transmitted.

When no bar code is demodulated or when the process at the step S9 is finished, a check is made at a step S5 as to whether the button is released. If the button is not released, the procedure goes back to the step S4.

If the step S5 finds that the button is released, a check is made at a step S6 as to whether a one-second time period has passed. If it has passed, the procedure goes back to the step S1, and the beam pattern A is selected again. Until the passage of the one-second time period, the check at the step S6 is repeated.

It is assumed that a bar-code menu is to be read when the beam pattern B is used. Because of this, the bar-code demodulation process at the step S4 checks relative motion between the bar-code reader and the bar code. If it is found that the bar-code reader exhibits no motion relative to the bar code, an operation to read the bar code is continued so as to obtain demodulated data. On the other hand, if it is ascertained during the process at the step S4 that the bar-code reader and the bar code are in relative motion with each other, obtained data is discarded. In order to check the movement of the bar-code reader, the demodulation process described in the previous embodiments may be used. Alternately, other relevant methods may be used for the check, and there is no restriction imposed on types of methods to be used.

Immediately prior to the step S6, the beam pattern B, which is suitable for reading a bar-code menu, is emitted and scanned in one direction. If the beam pattern is switched to the beam pattern A without any interval immediately after the release of the button, bar codes on the bar-code menu will be scanned by the beam pattern A. Since the beam pattern A is comprised of a plurality of scan beams in multiple directions, undesired bar codes will certainly be picked up by the scans.

In consideration of this, this embodiment waits a predetermined time period upon the release of the button before switching the beam pattern, thereby avoiding the above-identified problem. The demodulation process at the step S2 reads and demodulates a bar code regardless of whether there is relative movement between the bar-code reader and the bar code. If the beam pattern is switched during a time when the bar-code reader is being swept over the bar-code menu, irrelevant bar codes are bound to be detected. Delaying the switching of the beam pattern by a predetermined time period, therefore, should be quite effective in securing reliability.

During the waiting period of the step S6, the operator takes that the bar-code reading operation has already finished. In consideration of this, the bar-code reading process is stopped during the predetermined time period assigned for the switching of the beam pattern. That is, even if a bar code is scanned during this time period, obtained data is regarded as invalid. In this manner, it is possible to avoid such an instance in which a bar code is unexpectedly read.

Figure 21:
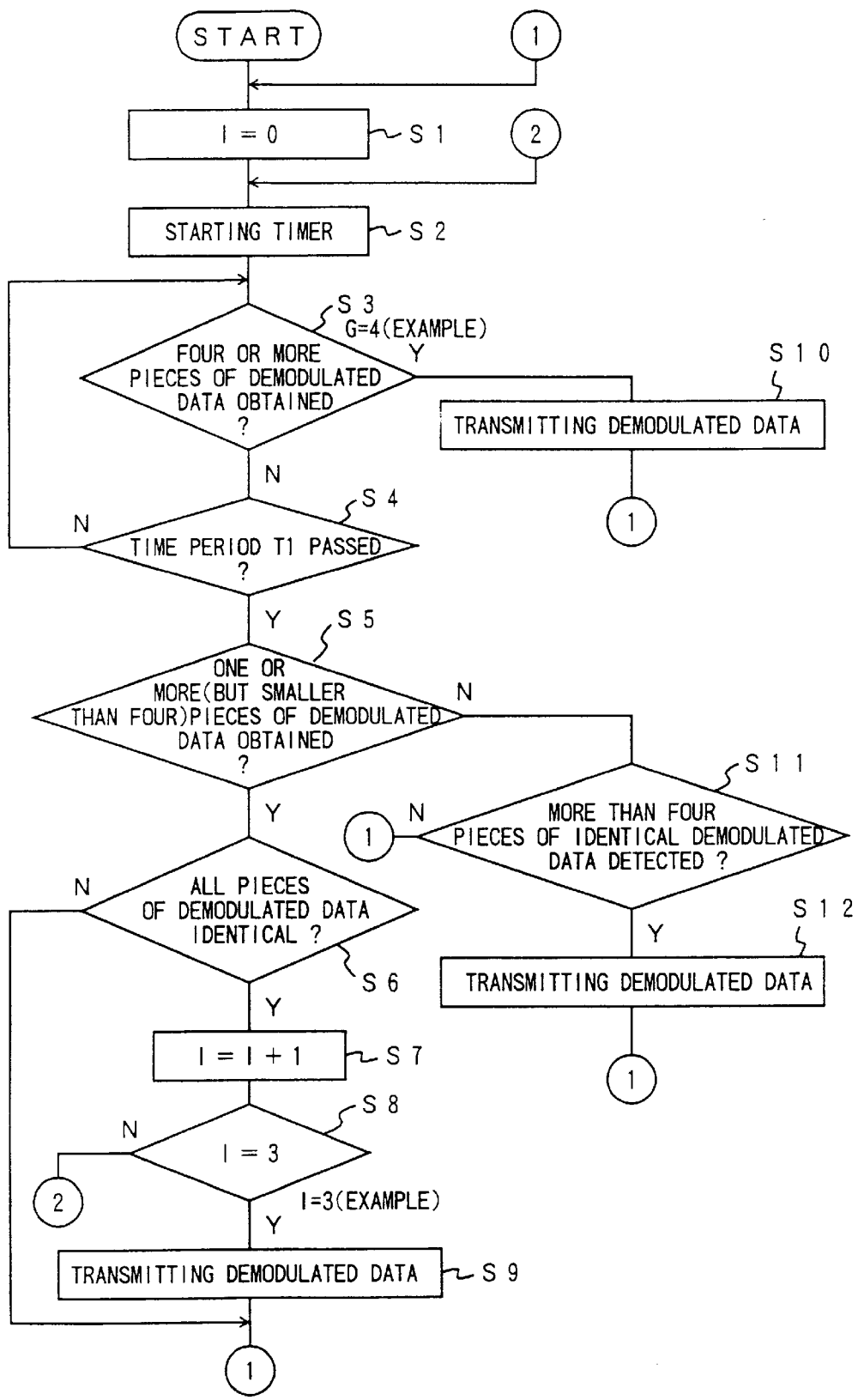
FIG. 21 is a flowchart of a process of reading a bar code according to another embodiment of the present invention.

FIG. 21 is a flowchart of a process of reading a bar code according to another embodiment of the present invention.

At a step S1, a count number I is set to zero upon a start of a bar-code-read operation. The count number I indicates how may times a bar-code-read operation is performed.

At a step S2, a timer is started. This timer goes off when a time period T1 passes. At a step S3, a check is made whether four or more pieces of demodulated data have been obtained and these pieces of demodulated data are the same. That is, for example, the procedure of FIG. 17 may be performed.

If four or more pieces of demodulated data identical to each other are obtained, it is ascertained that the read operation is successful. That is, the demodulated data is transmitted at the step S10. If the number of data pieces identical to each other is smaller than four, a check is made at a step S4 as to whether the timer detects an end of the time period T1.

If the time period T1 has not yet passed, the procedure goes back to the step S3.

If the step S4 finds that the time period T1 has already passed, a check is made at a step S5 as to whether one or more (but smaller than four) pieces of demodulated data identical to each other are obtained. If they are not obtained, this means that no demodulated data is obtained during the time period T1. In this case, at a step S12, a check is made whether five or more pieces of demodulated data identical to each other are obtained in total during the first and following bar-code-read operations. If they are obtained (i.e., at least five pieces of identical data are obtained), the read operation is regarded as successful and the demodulated data is transmitted at a step S13.

If the check at the step S5 gives an affirmative answer, it means that at least one piece of demodulated data is obtained during the time period T1. This case should be in a better condition in terms of demodulated-data detection than the case in which the check at the step S5 does not give an affirmative answer. At a step S6, a check is made whether the pieces of demodulated data obtained during the last bar-code-read operation (i.e., those obtained during the last time period T1), are the same as those obtained in all the previous bar-code-read operations. If they are not the same, the procedure goes back to the step S1 to repeat the following processes. If the obtained pieces of the demodulated data are the same as the previous pieces, the count number I is incremented by 1 at a step S7.

At a step S8, a check is made whether the count number I has become three. If it has, the entire read operation is regarded as successful, and the demodulated data is transmitted at a step S12. In this case, one or more pieces of demodulated data identical to each other have been obtained at least three times in a row, so that it is likely that the same bar code has been repeatedly demodulated. In this case, the entire read operation is regarded as a success despite a lack of the number of data pieces obtained during each loop (each bar-code-read operation).

If the count number I is smaller than three at the step S8, the procedure goes back to the step S2 to repeat the following process.

In the procedure of FIG. 21, conditions used for deciding whether the read operation is successful vary, depending on the number of the obtained pieces of demodulated data. Such changes in conditions are necessary to ensure reliability of the read operation. When the condition stipulated at the step S5 is not satisfied, no demodulated data may be obtained during a given time period T1, so that the pieces of demodulated data offer only a limited level of reliability. When the condition of the step S5 is met, at least one piece of demodulated data is obtained during each time period T1. In such a case, it is more likely that the pieces of demodulated data are obtained from the same bar code. In consideration of these, it is reasonable to change conditions for deciding whether the read operation is successful between the former case and the latter case.

The procedure shown in FIG. 21 is devised to cope with each of these two cases.

Figure 22:
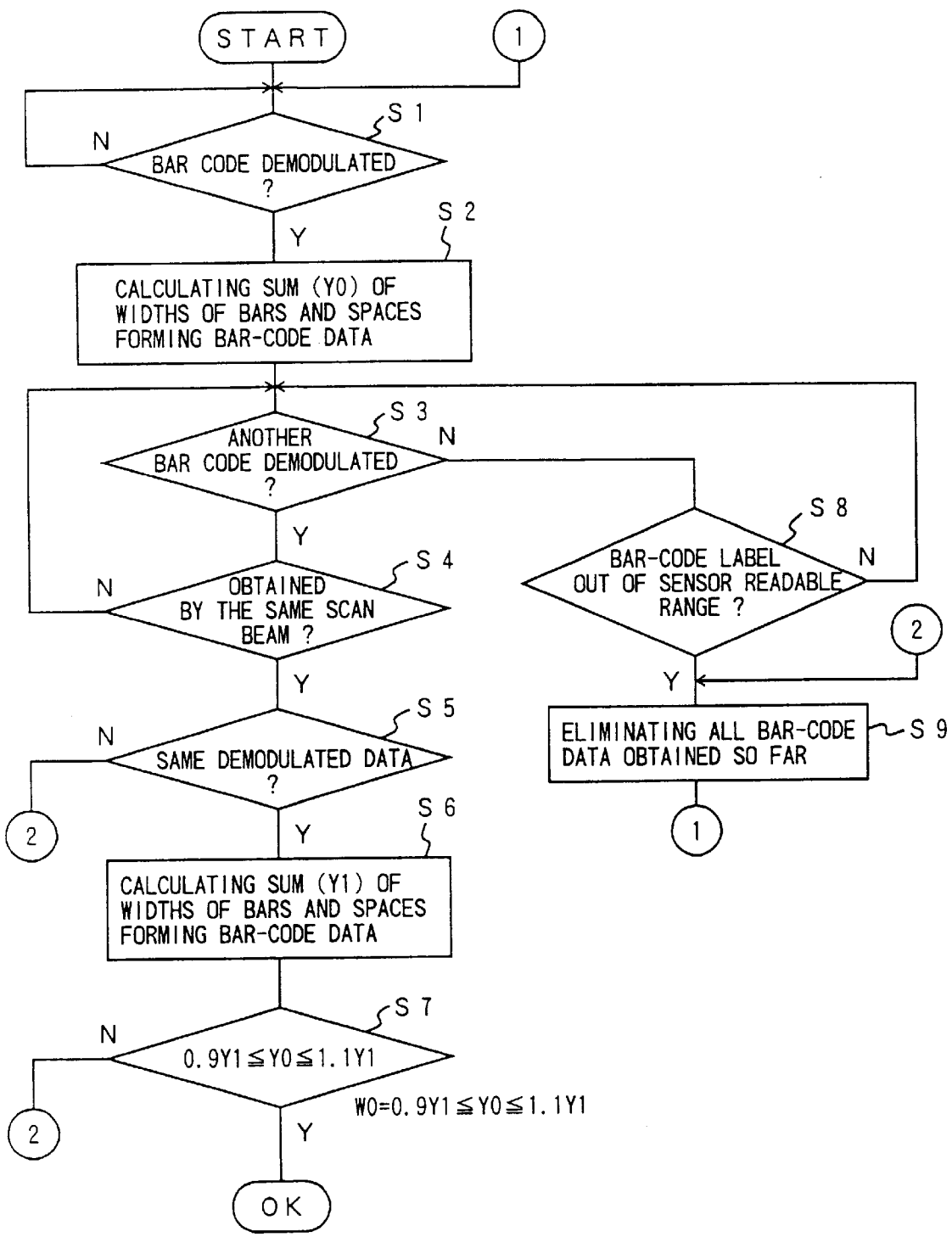
FIG. 22 is a flowchart of a process of reading a bar code according to another embodiment of the present invention.

FIG. 22 is a flowchart of a process of reading a bar code according to another embodiment of the present invention.

After a start of a read operation, at a step S1, a check is made whether a bar code is demodulated. If it is, the procedure goes to a step S2. Otherwise, the procedure goes back to repeat the step S1.

At the step S2, a sum Y0 of widths of bars and spaces forming the demodulated bar code is obtained. Here, the sum Y0 is represented by a count number.

At a step S3, a check is made whether another bar code is demodulated. If it is not, the procedure goes to a step S8, where a check is made as to whether the bar code label has gone out of the scan range. If it has gone out of the range, all the demodulated data is discarded at a step S9 before the procedure goes back to the step S1.

If another bar code is demodulated at the step S3, a check is made at a step S4 as to whether the demodulated data of the step S3 and the demodulated data of the step S1 are obtained by the same scan (by the same scan beam). If they are not, the procedure goes back to the step S3.

If the step S4 finds that the two pieces of the demodulated data are obtained by the same scan beam, a check is made at a step S5 as to whether the demodulated data obtained at the step S1 and the demodulated data obtained at the step S3 are the same. If they are not, it is ascertained that there is a relative motion between the bar-code reader and the bar code. In this case, the procedure goes to the step S9. If the two demodulated data are the same, the procedure goes to a step S6.

At the step S6, a sum Y1 of widths of bars and spaces is obtained with regard to the data demodulated at the step S3. At a step S7, a comparison is made between Y0 and Y1.

A width of a bar code detected by the bar-code reader depends on a distance between the bar-code reader and the detected bar code. The shorter the distance, the wider the detected width of the bar code. The longer the distance, the narrower the detected width of the bar code.

Drawing on this fact, a comparison of bar-code widths between two demodulated bar codes obtained at different timings gives an indication as to whether the bar-code reader and the bar code are in motion relative to each other. That is, relative movement can be detected based on a difference in distances.

If no substantial change is present with regard to a distance between the bar-code reader and the bar code, the obtained widths of bar codes should exhibit no substantial difference. The embodiment shown in FIG. 22 draws on this fact.

At the step S7, a check is made as to whether the condition $$0.9Y1 \leq Y0 \leq 1.1Y1$$

is satisfied. If this is satisfied, it is ascertained that there is no relative movement between the bar-code reader and the bar code, and the read operation is regarded as successful. If the value of the sum Y0 does not fall within the above-identified range, it means that the bar-code reader is in motion so that a distance from the bar code is increased or decreased.

A 10-% tolerance range is provided for the above-mentioned condition of the sums Y0 and Y1. Alternately, no tolerance range is put in place so that a condition Y0=Y1 may be used. It is difficult, however, for an operator holding the bar-code reader to keep the bar-code reader absolutely still, so that the check at the step S7 should take into account a certain amount of errors. If no error is accepted, there may be a case in which no bar code can be read from the bar-code menu.

The tolerance range provided for the check at the step S7 may be broadened. This case, however, may results in a read operation being regarded as successful even when the bar-code reader is shifted to such an extent that the obtained data should be treated as invalid data.

The tolerance range may be decided by taking into consideration various factors regarding operations of the device.

Figure 23:
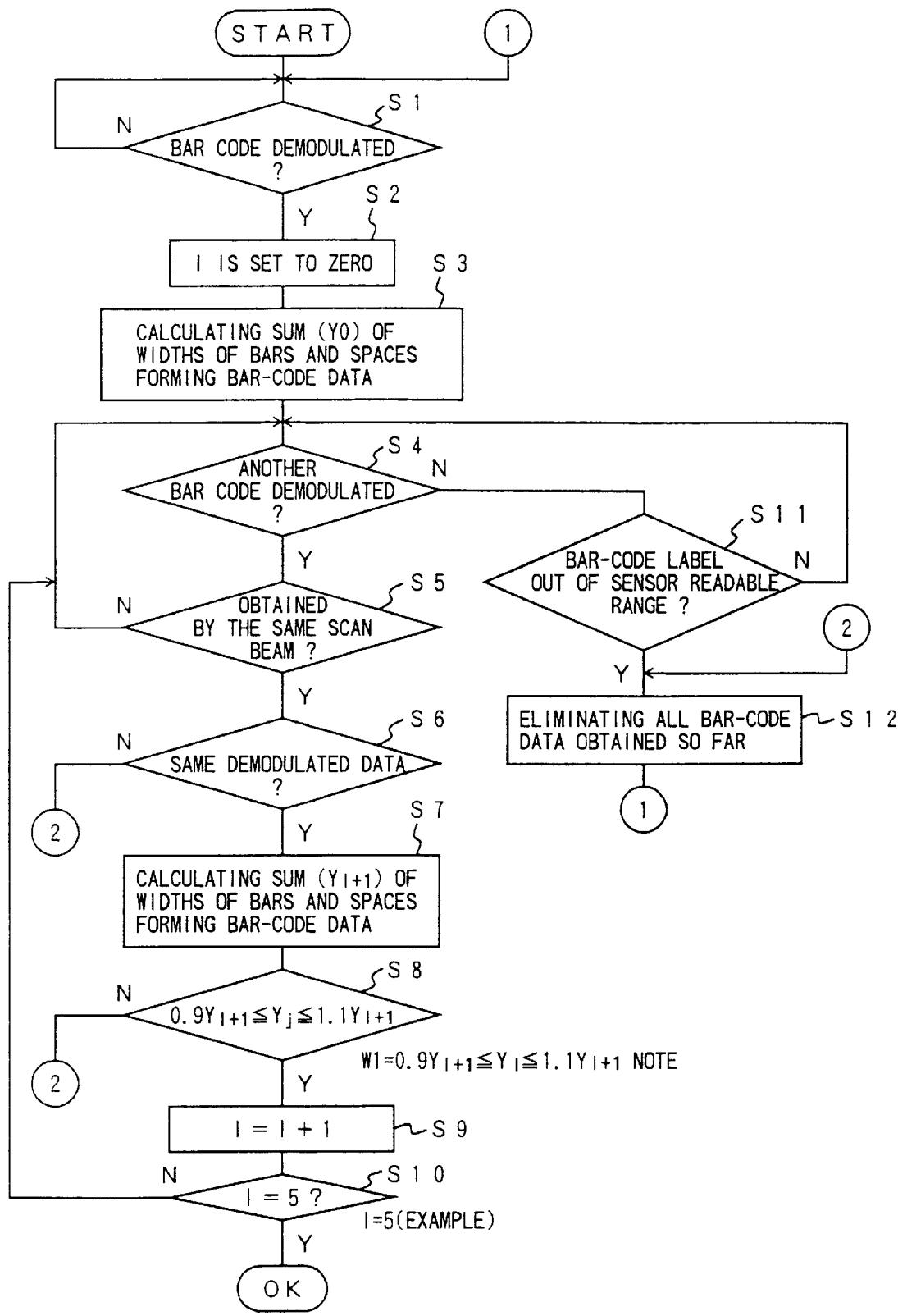
FIG. 23 is a flowchart of a process of reading a bar code according to a variation of the embodiment of FIG. 22.

FIG. 23 is a flowchart of a process of reading a bar code according to a variation of the embodiment of FIG. 22. In FIG. 22, a decision on validity of demodulated data is made based on a comparison of bar-code widths between the bar code obtained at the step S1 and the bar code obtained at the step S3. On the other hand, the embodiment of FIG. 23 checks the validity based on comparisons of bar-code widths with regard to three or more bar codes.

At a step S1 in FIG. 23, after a start of a read operation, a check is made whether a bar code is demodulated. If it is, the procedure goes to a step S2. Otherwise, the procedure goes back to repeat the step S1.

At the step S2, a count number I is set to zero. At a step S3, a sum Y0 of widths of bars and spaces forming the demodulated bar code is obtained.

At a step S4 following the step S3, a check is made whether another bar code is demodulated. If it is not, the procedure goes to a step S11, where a check is made as to whether the bar-code label has gone out of the scan range. If it has not gone out of the range, the procedure goes back to the step S4.

If the bar-code label has gone out of the range, it is fair to conclude that the bar-code reader is in motion relative to the bar code. In this case, all the demodulated data so far obtained is discarded at a step S12 so as to invalidate the read operation, and, then, the procedure goes back to the step S1

If another bar code is demodulated at the step S4, a check is made at a step S5 as to whether the demodulated data of the step S4 and the previously demodulated data (the demodulated data of the step S1 when the step S5 is first performed) are obtained by the same scan beam. If they are obtained by different scan beams (i.e., scan beams in different directions), the procedure goes back to the step S4 after discarding the demodulated data obtained at the step S4.

If the step S5 finds that the two pieces of the demodulated data are obtained by the same scan beam, a check is made at a step S6 as to whether the demodulated data obtained at the step S4 and the previously demodulated data are the same. If they are not, it is ascertained that two different bar codes are demodulated. In this case, the procedure goes to the step S12.

If the two demodulated data are the same, the procedure goes to a step S7, where a sum $Y_{I+1}$ of widths of bars and spaces is obtained with regard to the data demodulated at the step S4.

At a step S8, a comparison is made between the sum $Y_I$ the already demodulated data (e.g., Y0 obtained at the step S3) and the sum $Y_{I+1}$. In detail, a check is made whether a relation $$0.9Y_{I+1} \leq Y_I \leq Y_{I+1}$$

is satisfied. As can be seen, a 10-% tolerance level is provided.

The above process at the step S8 determines whether $Y_I$ and $Y_I$ are substantially the same width so as to check if the bar-code reader and the bar code are in relative motion with each other..

If the above relation regarding $Y_I$ and $Y_{I+1}$ is not satisfied, it is ascertained that the bar-code reader is moving relative to the bar code, and the procedure goes to the step S12.

If the above relation between $Y_I$ and $Y_{I+1}$ is met, this means that the bar-code reader and the bar code have no relative motion with respect to each other. In this case, the count number I is incremented by 1 at a step S9, and, then, a check is made at a step S10 as to whether the count number I has reached a count of 5.

If the count number I has reached 5, this is an indication that the steps S4 through S10 are repeated five times consecutively. Since bar-codes substantially identical to each other are demodulated five times in row, it is ascertained that there is no relative motion between the bar-code reader and the bar code, and the read operation is treated as a success. In this case, five bar codes having the same width are obtained. Since a larger number of data points is obtained compared to the case of FIG. 22, more reliable check results are obtained with regard to the movement of the bar-code reader.

If the count number has not reached 5 at the step S10, the procedure goes back to the step S4 to repeat the step S4 and the following steps.

The sum $Y_I$ used in the check of the step S8 may be any one of Y0 through $Y_I$. That is, the sum $Y_I$ may be a sum of any demodulated data as long as such demodulated data is obtained prior to the demodulated data of the step S4. Further, one and the same sum may be selected from the sums Y0 through $Y_J$, and may be used repeatedly in the check at the step S8.

Further, the present invention is not limited to these embodiments, but various variations and modifications may be made without departing from the scope of the present invention.

What is claimed is:

1. A method of reading a bar code based on bar-code data obtained by scanning said bar code with light, said method comprising the steps of:

a) obtaining a number as to how many pieces of bar-code data identical to each other are obtained during a predetermined time period;

b) accepting said bar-code data as valid data when said number is at least as large as a predetermined number;

c) repeating said step a) with respect to each of different time periods equivalent to said predetermined time period to obtain numbers including said number when said number is smaller than said predetermined number; and d) deciding whether said bar-code data is valid based on said numbers and said different time periods.

2. The method as claimed in claim 1, wherein said step d) comprises a step of accepting said bar-code data as valid data when a sum of said numbers exceeds a predetermined number.

3. The method as claimed in claim 1, wherein said step d) comprises a step of accepting said bar-code data as valid data when each of said numbers exceeds a predetermined number.

* * * * *